(12) United States Patent
Suzuki et al.

(10) Patent No.: US 10,732,103 B2
(45) Date of Patent: Aug. 4, 2020

(54) INFORMATION PROCESSING APPARATUS, IMAGE FORMING APPARATUS, INFORMATION PROCESSING METHOD, AND STORAGE MEDIUM

(71) Applicant: CANON KABUSHIKI KAISHA, Tokyo (JP)

(72) Inventors: Takahiro Suzuki, Tokyo (JP); Toshiyuki Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/163,599

(22) Filed: Oct. 18, 2018

(65) Prior Publication Data

US 2019/0094141 A1 Mar. 28, 2019

Related U.S. Application Data

(63) Continuation of application No. PCT/JP2017/007337, filed on Feb. 27, 2017.

(30) Foreign Application Priority Data

May 18, 2016 (JP) .................................. 2016-099823

(51) Int. Cl.
*G01N 21/55* (2014.01)
*B41J 2/525* (2006.01)
(Continued)

(52) U.S. Cl.
CPC .............. *G01N 21/55* (2013.01); *B41J 2/525* (2013.01); *G01N 21/21* (2013.01); *G06K 15/00* (2013.01);
(Continued)

(58) Field of Classification Search
CPC .. G01N 21/55; G01N 21/21; G01N 2021/556; B41J 2/525; B41J 2/2114;
(Continued)

(56) References Cited

U.S. PATENT DOCUMENTS 3,986,160 A   10/1976  Turner
5,521,657 A    5/1996  Klopotek
(Continued)

FOREIGN PATENT DOCUMENTS

JP   H08-039841 A   2/1996
JP   2003-145733 A   5/2003
(Continued)

OTHER PUBLICATIONS

May 16, 2017 International Search Report in International Patent Appln. No. PCT/JP2017/007337.
(Continued)

*Primary Examiner* — Mohamed K Amara
(74) *Attorney, Agent, or Firm* — Venable LLP

(57) ABSTRACT

An information processing apparatus generates a signal value for forming an image of an object as a recording layer on a recording medium. The apparatus inputs a characteristic of specular reflection light, a characteristic of internal diffuse reflection light, and a characteristic of surficial diffuse reflection light. Then, the apparatus derives, based on the characteristic of the internal diffuse reflection light, a first signal value for a first recording layer to be formed on the recording medium, and derives, based on the characteristic of the specular reflection light and the characteristic of the surficial diffuse reflection light, a second signal value for a second recording layer different from the first recording layer to be formed on the recording medium.

16 Claims, 25 Drawing Sheets

(51) Int. Cl.
*G06K 15/00* (2006.01)
*G06K 15/02* (2006.01)
*G01N 21/21* (2006.01)
*B41J 2/21* (2006.01)

(52) U.S. Cl.
CPC ..... *G06K 15/1852* (2013.01); *G06K 15/1872* (2013.01); *G06K 15/1889* (2013.01); *B41J 2/2114* (2013.01); *G01N 2021/556* (2013.01)

(58) Field of Classification Search
CPC ............... G06K 15/00; G06K 15/1889; G06K 15/1872; G06K 15/1852
See application file for complete search history.

(56) References Cited

U.S. PATENT DOCUMENTS

| | | | |
|---|---|---|---|
| 5,835,116 A * | 11/1998 | Sato | B41J 2/2114 347/98 |
| 6,166,814 A | 12/2000 | Pringle | |
| 6,222,970 B1 * | 4/2001 | Wach | A61B 5/14546 385/115 |
| 6,370,406 B1 * | 4/2002 | Wach | G01N 21/474 356/301 |
| 6,439,708 B1 * | 8/2002 | Kato | B41J 2/01 347/100 |
| 6,443,568 B1 * | 9/2002 | Askeland | B41J 2/2114 347/100 |
| 6,733,105 B2 | 5/2004 | Tatsumi | |
| 7,221,445 B2 * | 5/2007 | Earthman | G01N 21/4738 356/237.2 |
| 8,314,971 B2 * | 11/2012 | Nishiyama | H04N 1/54 358/2.1 |
| 8,611,674 B1 * | 12/2013 | Beeler | G06K 9/4661 382/103 |
| 8,632,146 B2 * | 1/2014 | Yoshida | B41J 2/2107 347/9 |
| 8,851,658 B2 | 10/2014 | Yamamoto et al. | |
| 8,976,361 B2 * | 3/2015 | Kato | G01N 21/55 356/445 |
| 9,103,717 B2 | 8/2015 | Oba et al. | |
| 9,222,882 B2 * | 12/2015 | Hirabayashi | G01N 21/57 |
| 9,266,352 B2 * | 2/2016 | Liu | B41J 3/407 |
| 2003/0090555 A1 | 5/2003 | Tatsumi | |
| 2004/0201660 A1 * | 10/2004 | Nishikawa | B41J 2/2114 347/100 |
| 2006/0284929 A1 | 12/2006 | Matsuzawa et al. | |
| 2007/0047157 A1 | 3/2007 | Miyahara et al. | |
| 2008/0186390 A1 | 8/2008 | Sato et al. | |
| 2008/0317980 A1 | 12/2008 | Yuba et al. | |
| 2010/0284014 A1 | 11/2010 | Baba et al. | |
| 2011/0157272 A1 * | 6/2011 | Ikehata | B41J 2/2114 347/16 |
| 2012/0057145 A1 | 3/2012 | Tunnell et al. | |
| 2012/0140233 A1 | 6/2012 | Rockwell et al. | |
| 2013/0057608 A1 | 3/2013 | Yamamoto et al. | |
| 2013/0216245 A1 | 8/2013 | Hoshi et al. | |
| 2013/0228674 A1 | 9/2013 | Oba et al. | |
| 2014/0329172 A1 * | 11/2014 | Hart | G03H 1/04 430/2 |
| 2015/0116835 A1 | 4/2015 | Ogumi et al. | |
| 2016/0109364 A1 * | 4/2016 | Ohba | G03G 15/326 356/369 |
| 2016/0267348 A1 | 9/2016 | Kondo | |
| 2017/0316758 A1 | 11/2017 | Atkins | |

FOREIGN PATENT DOCUMENTS

| | | |
|---|---|---|
| JP | 2012-044421 A | 3/2012 |
| JP | 2013-181797 A | 9/2013 |
| JP | 2017020870 A * | 1/2017 |
| WO | 2011/142448 A1 | 11/2011 |

OTHER PUBLICATIONS

Yanxiang Lan, et al., "Bi-Scale Appearance Fabrication", ACM Transactions on Graphics (TOG)—Siggraph 2013 Conference Proceedings TOG Homepage Archive, vol. 32, Issue 4, Jul. 2013.

* cited by examiner

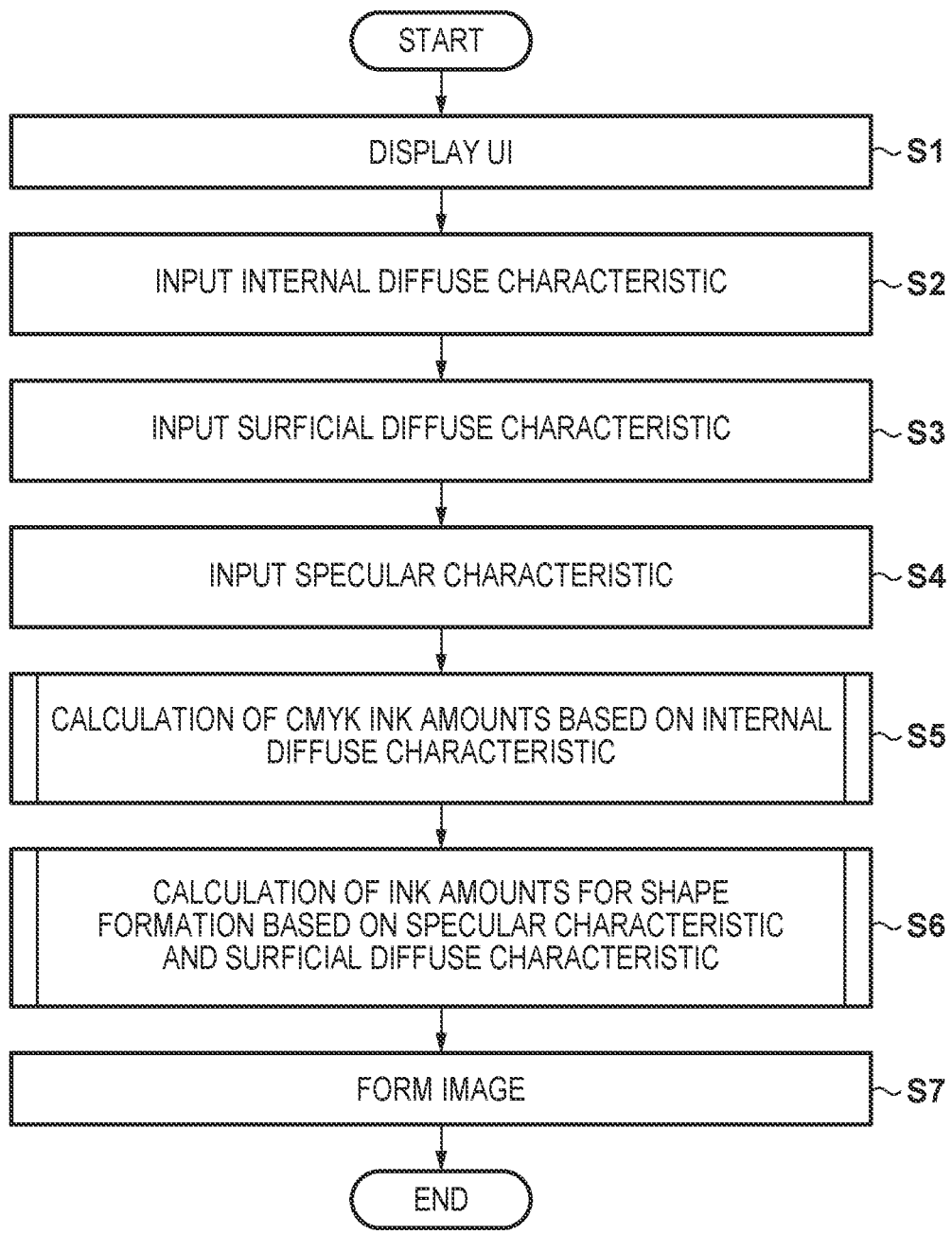

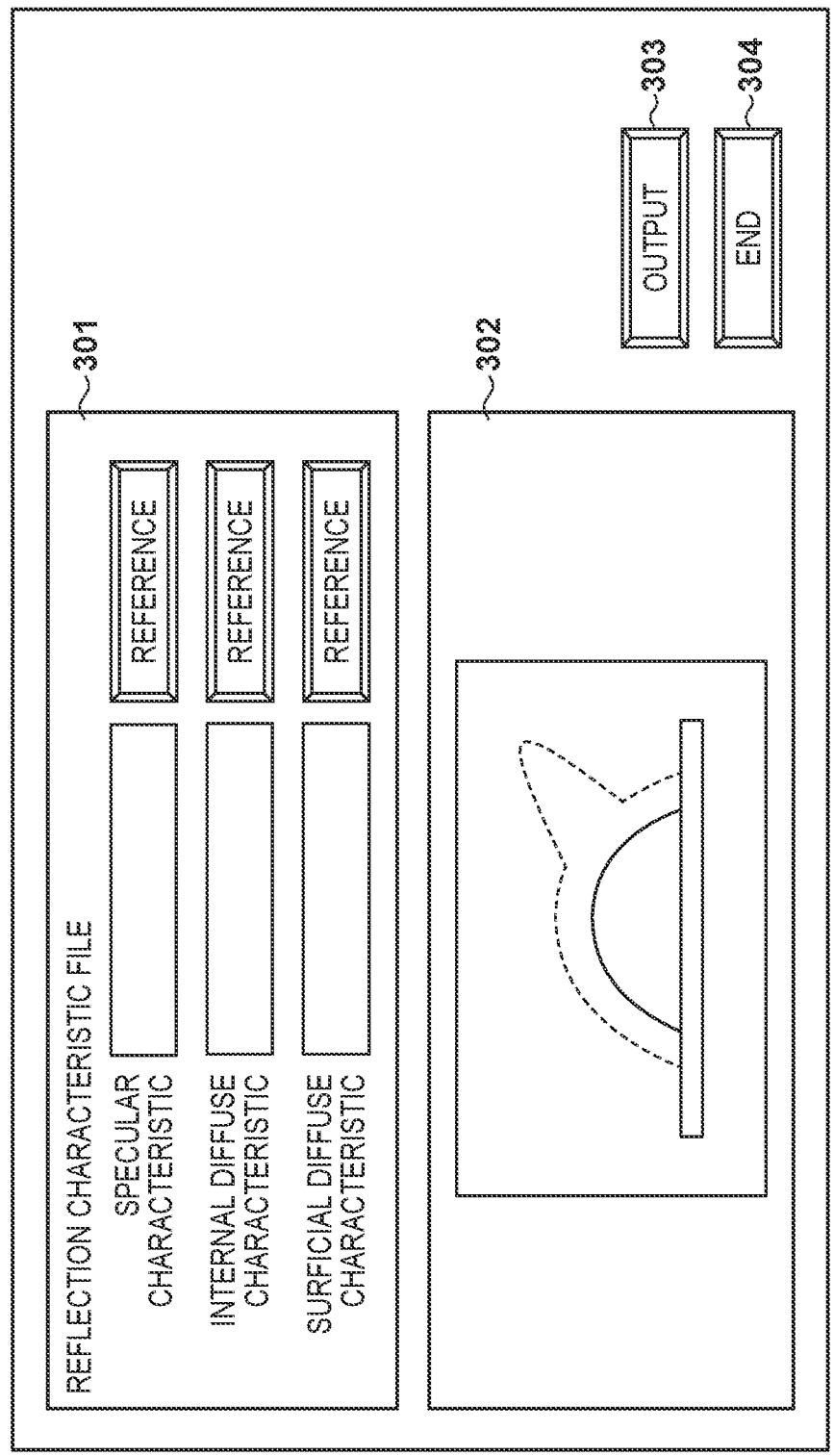

FIG. 7A

| | |
|---|---|
| LIGHT SOURCE : $X_n, Y_n, Z_n$, <br> PIXEL COUNT M×N, <br> SIZE :XXμm | |
| 1 | $Xi_1, Yi_1, Zi_1$ |
| 2 | $Xi_2, Yi_2, Zi_2$ |
| ⋮ | ⋮ |
| M×N | $Xi_{M \times N}, Yi_{M \times N}, Zi_{M \times N}$ |

INTERNAL DIFFUSE CHARACTERISTIC FILE

FIG. 7B

| | LIGHT SOURCE : $X_n, Y_n, Z_n$,<br>PIXEL COUNT  M×N,<br>SIZE : XXμm |
|---|---|
| 1 | $XI_1, YI_1, ZI_1$ |
| 2 | $XI_2, YI_2, ZI_2$ |
| ⋮ | ⋮ |
| M×N | $XI_{M×N}, YI_{M×N}, ZI_{M×N}$ |

SURFICIAL DIFFUSE CHARACTERISTIC FILE

FIG. 7C

| | LIGHT SOURCE : $X_n, Y_n, Z_n,$<br>PIXEL COUNT   M×N,<br>SIZE : XXμm |
|---|---|
| 1 | $Xs_1, Ys_1, Zs_1$ |
| 2 | $Xs_2, Ys_2, Zs_2$ |
| ⋮ | ⋮ |
| M×N | $Xs_{M\times N}, Ys_{M\times N}, Zs_{M\times N}$ |

SPECULAR CHARACTERISTIC FILE

FIG. 10

| COLOR INK AMOUNT | | | | Lab | | |
|---|---|---|---|---|---|---|
| C | M | Y | K | L | a | b |
| XXX | XXX | XXX | XXX | XXX | XXX | XXX |
| XXX | XXX | XXX | XXX | XXX | XXX | XXX |
| XXX | XXX | XXX | XXX | XXX | XXX | XXX |
| . | . | . | . | . | . | . |
| . | . | . | . | . | . | . |
| XXX | XXX | XXX | XXX | XXX | XXX | XXX |
| XXX | XXX | XXX | XXX | XXX | XXX | XXX |
| . | . | . | . | . | . | . |
| . | . | . | . | . | . | . |
| . | . | . | . | . | . | . |
| XXX | XXX | XXX | XXX | XXX | XXX | XXX |
| XXX | XXX | XXX | XXX | XXX | XXX | XXX |
| . | . | . | . | . | . | . |
| . | . | . | . | . | . | . |
| . | . | . | . | . | . | . |
| XXX | XXX | XXX | XXX | XXX | XXX | XXX |
| XXX | XXX | XXX | XXX | XXX | XXX | XXX |

FIG. 12

| CLEAR INK AMOUNT (DISCHARGE COUNT) CL | HEIGHT (μm) |
|---|---|
| 1 | XXX |
| 2 | XXX |
| 3 | XXX |
| 4 | XXX |
| 5 | XXX |
| 6 | XXX |
| 7 | XXX |
| 8 | XXX |
| 9 | XXX |
| 10 | XXX |
| . | . |
| . | . |
| . | . |

▨ :INK 1 DOT

↑ :NORMAL TO FINE SURFACE

↑ :NORMAL TO PRINTING SURFACE

DIRECTIONS OF POLARIZING FILTERS OF LIGHT SOURCE
AND LIGHT RECEIVING UNIT ARE PARALLEL

DIRECTIONS OF POLARIZING FILTERS OF LIGHT SOURCE
AND LIGHT RECEIVING UNIT ARE ORTHOGONAL

FIG. 15

| INCIDENT ELEVATION ANGLE ($\theta i$) | LIGHT RECEIVING ELEVATION ANGLE ($\theta r$) | XYZ (PARALLEL) | X'Y'Z' (ORTHOGONAL) |
|---|---|---|---|
| 45 | -60 | (X1,Y1,Z1) | (X1',Y1',Z1') |
| 45 | -55 | (X2,Y2,Z2) | (X2',Y2',Z2') |
| 45 | -50 | (X3,Y3,Z3) | (X3',Y3',Z3') |
| 45 | -45 | (X4,Y4,Z4) | (X4',Y4',Z4') |
| 45 | -40 | (X5,Y5,Z5) | (X5',Y5',Z5') |
| 45 | -35 | (X6,Y6,Z6) | (X6',Y6',Z6') |
| 45 | -30 | (X7,Y7,Z7) | (X7',Y7',Z7') |
| 45 | -25 | (X8,Y8,Z8) | (X8',Y8',Z8') |
| 45 | -20 | (X9,Y9,Z9) | (X9',Y9',Z9') |
| 45 | -15 | (X10,Y10,Z10) | (X10',Y10',Z10') |
| 45 | -10 | (X11,Y11,Z11) | (X11',Y11',Z11') |
| 45 | -5 | (X12,Y12,Z12) | (X12',Y12',Z12') |
| 45 | 0 | (X13,Y13,Z13) | (X13',Y13',Z13') |
| 45 | 5 | (X14,Y14,Z14) | (X14',Y14',Z14') |
| 45 | 10 | (X15,Y15,Z15) | (X15',Y15',Z15') |
| 45 | 15 | (X16,Y16,Z16) | (X16',Y16',Z16') |
| 45 | 20 | (X17,Y17,Z17) | (X17',Y17',Z17') |
| 45 | 25 | (X18,Y18,Z18) | (X18',Y18',Z18') |
| 45 | 30 | (X19,Y19,Z19) | (X19',Y19',Z19') |
| 45 | 35 | (X20,Y20,Z20) | (X20',Y20',Z20') |
| 45 | 40 | (X21,Y21,Z21) | (X21',Y21',Z21') |
| 45 | 45 | (X22,Y22,Z22) | (X22',Y22',Z22') |
| 45 | 50 | (X23,Y23,Z23) | (X23',Y23',Z23') |
| 45 | 55 | (X24,Y24,Z24) | (X24',Y24',Z24') |
| 45 | 60 | (X25,Y25,Z25) | (X25',Y25',Z25') |
| 45 | -60 | (X26,Y26,Z26) | (X26',Y26',Z26') |
| 45 | -55 | (X27,Y27,Z27) | (X27',Y27',Z27') |
| ... | ... | ... | ... |

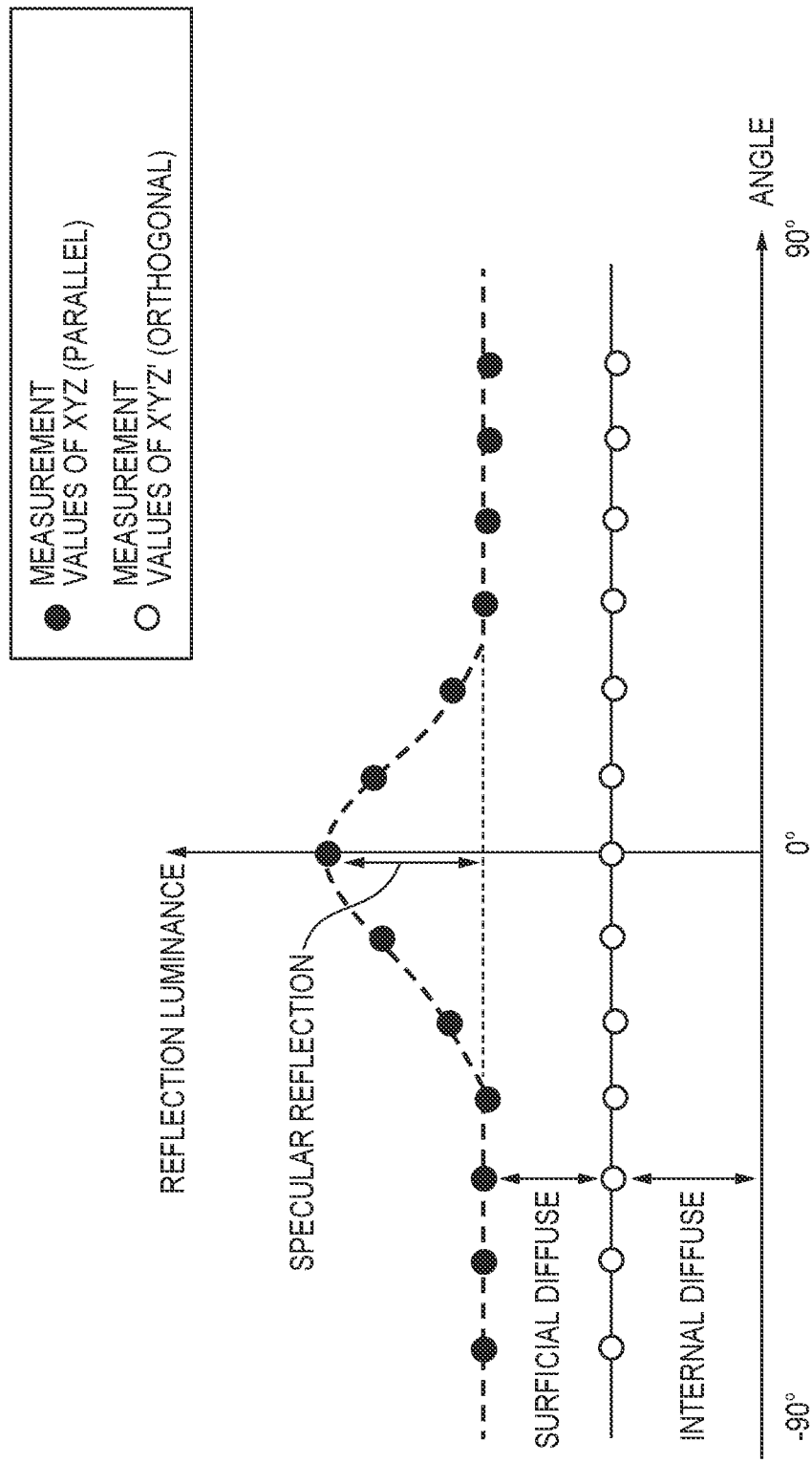

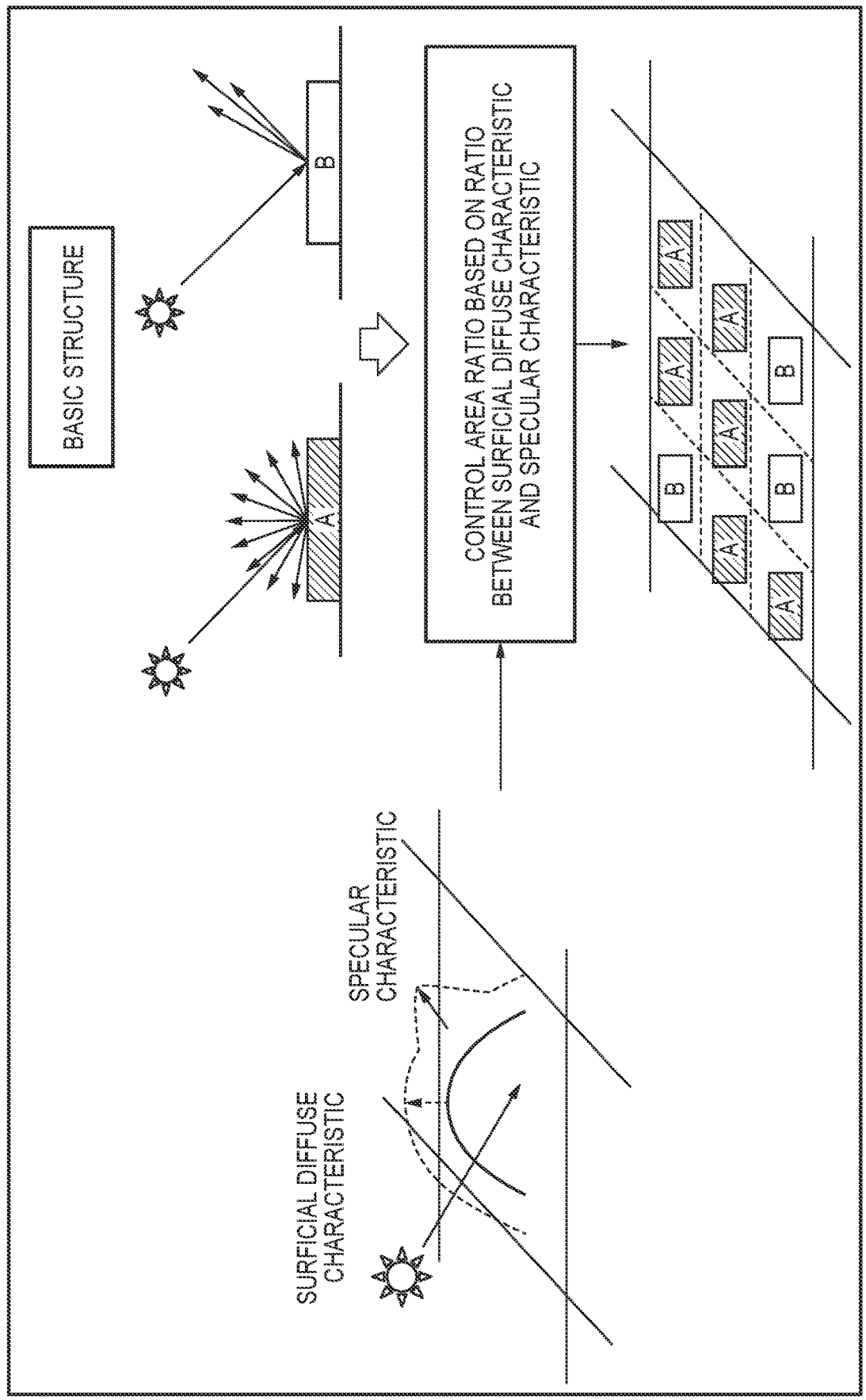

| LIGHT SOURCE: $X_N$, $Y_N$, $Z_N$, PIXEL COUNT: M × N, SIZE: XX μm | | |
|---|---|---|
| | 0° | 30° |
| 1 | $XI\_0_1$, $YI\_0_1$, $ZI\_0_1$ | $XI\_30_1$, $YI\_30_1$, $ZI\_30_1$ |
| 2 | $XI\_0_2$, $YI\_0_2$, $ZI\_0_2$ | $XI\_30_2$, $YI\_30_2$, $ZI\_30_2$ |
| ⋮ | ⋮ | ⋮ |
| M×N | $XI\_0_{M \times N}$, $YI\_0_{M \times N}$, $ZI\_0_{M \times N}$ | $XI\_30_{M \times N}$, $YI\_30_{M \times N}$, $ZI\_30_{M \times N}$ |

INFORMATION PROCESSING APPARATUS, IMAGE FORMING APPARATUS, INFORMATION PROCESSING METHOD, AND STORAGE MEDIUM

CROSS-REFERENCE TO RELATED APPLICATIONS

This application is a Continuation of International Patent Application No. PCT/JP2017/007337, filed Feb. 27, 2017, which claims the benefit of Japanese Patent Application No. 2016-099823, filed May 18, 2016, both of which are hereby incorporated by reference herein in their entirety.

BACKGROUND OF THE INVENTION

Field of the Invention

The present invention relates to an image forming technique based on the reflection characteristic information of an object.

Background Art

There is provided a bidirectional reflectance distribution function (BRDF) as a method of representing the reflection characteristics of an object. A BRDF is obtained by describing a reflection characteristic for each angle of the object. It is possible to reproduce the appearance (material appearance) of the object in accordance with a light source/viewpoint by reproducing a BRDF. If the BRDF is processed intact, the data amount is huge. Thus, a method of defining a model called a reflection model and approximating/representing the BRDF by the parameters of the model is often used.

As a reflection model, a model representing a specular reflection characteristic indicating the characteristic of reflected light in a specular reflection direction on an object surface with respect to incident light and a diffuse reflection characteristic indicating the characteristic of light reflected in a direction other than the specular reflection direction is common. NPL 1 proposes a technique of inputting the specular characteristic and diffuse characteristic of a target material and generating a printed material.

To reproduce the material appearance of an object, it is only necessary to correctly obtain and reproduce the above-described specular reflection characteristic and diffuse reflection characteristic. However, diffuse reflection includes two reflected light components different in property, that is, internal diffuse reflection light and surficial diffuse reflection light, and the diffuse reflection characteristic changes non-linearly depending on an observation light source. The internal diffuse reflection light is light that exits again from the surface after scattering and absorption in the object, and the surficial diffuse reflection light is light that is diffused and reflected in all directions due to the fine uneven structure of the object surface. Thus, for example, even if the diffuse reflection characteristic under a given measurement light source is reproduced, diffuse reflection light under another observation light source cannot be reproduced.

CITATION LIST

Non Patent Literature

NPL 1: YAUXIANG LAN, YUE DONG, FABIO PELLACINI, XIN TONG, "BI-SCALE APPEARANCE FABRICATION", ACM TRANSACTIONS ON GRAPHICS (TOG)—SIGGRAPH 2013 CONFERENCE PROCEEDINGS TOG HOMEPAGE ARCHIVE, VOLUME 32 ISSUE 4, JULY 2013

SUMMARY OF THE INVENTION

According to one aspect of the present invention, the information processing apparatus that generates a signal value for forming an image of an object as a recording layer on a recording medium includes a first input unit configured to input a characteristic of specular reflection light as a reflected light component in a specular reflection direction with respect to a surface of the object, a second input unit configured to input a characteristic of internal diffuse reflection light as a reflected light component after scattering and absorption in the object, a third input unit configured to input a characteristic of surficial diffuse reflection light as a reflected light component diffused by the surface of the object, a first deriving unit configured to derive, based on the characteristic of the internal diffuse reflection light, a first signal value for a first recording layer to be formed on the recording medium, and a second deriving unit configured to derive, based on the characteristic of the specular reflection light and the characteristic of the surficial diffuse reflection light, a second signal value for a second recording layer different from the first recording layer to be formed on the recording medium.

The present invention provides an image forming technique capable of reproducing the material appearance of an object more correctly.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a flowchart illustrating processing executed by the image processing apparatus according to the first embodiment;

FIG. 6 is a view showing an example of a user interface displayed on a UI display unit 202;

FIG. 7A is a table showing an example of an internal diffuse characteristic file;

FIG. 7B is a table showing an example of a surficial diffuse characteristic file;

FIG. 7C is a table showing an example of a specular characteristic file;

FIG. 10 is a table showing an example of a color output characteristic;

FIG. 12 is a table showing the correspondence between an ink discharge count and a height (thickness);

FIG. 15 is a table showing an example of measurement data obtained by measurement;

FIG. 16 is a graph for explaining the correspondences between three kinds of reflected light components and measurement values;

FIG. 19 is a view for explaining a concept of area ratio control of the basic structure;

DESCRIPTION OF THE EMBODIMENTS

Preferred embodiments of the present invention will be described in detail below with reference to the accompanying drawings. Note that the following embodiments are merely examples, and are not intended to limit the scope of the present invention.

First Embodiment

As the first embodiment of an information processing apparatus according to the present invention, a form in which a profile storing three reflection characteristics (specular characteristic, internal diffuse characteristic, and surficial diffuse characteristic) is used for image formation will be described.

Components of Reflected Light

Figure 1:
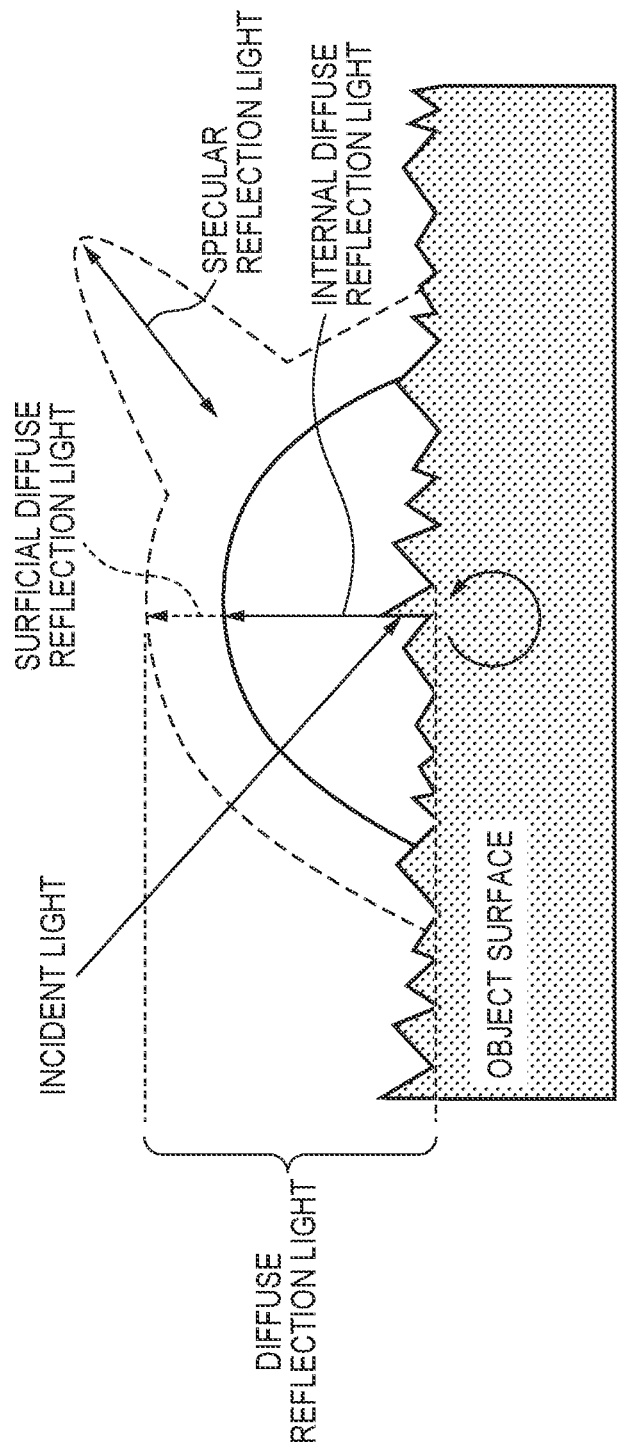
FIG. 1 is a schematic view for explaining reflected light from an object with respect to incident light.

FIG. 1 is a schematic view for explaining reflected light from an object with respect to incident light. As shown in FIG. 1, the reflected light includes specular reflection light as reflected light in the specular reflection direction and diffuse reflection light as reflected light in a direction other than the specular reflection direction. Furthermore, the diffuse reflection light includes internal diffuse reflection light which exits again from the surface after scattering and absorption in the object and surface diffuse reflection light which is diffused and reflected in all directions due to the fine uneven structure of the object surface.

The internal diffuse reflection light has a characteristic that it changes depending on the color absorptance of the object, and the surface diffuse reflection light has a characteristic that it changes depending on the surface shape of the object and the refractive index of the material of the object. Therefore, if the geometric conditions or light amount of an observation light source changes, different change amounts are obtained.

Figure 2:
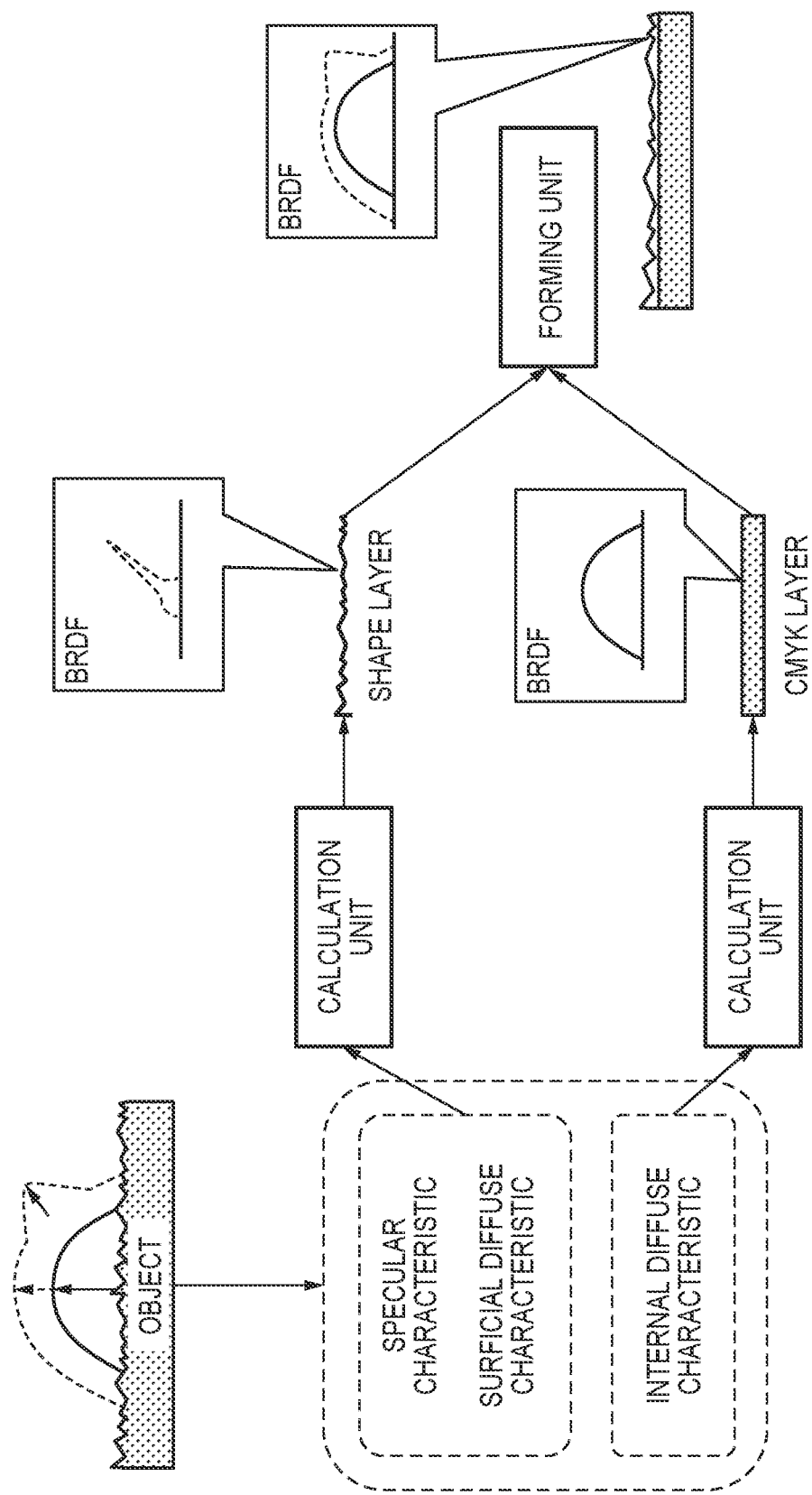
FIG. 2 is a view for explaining an overview of image forming processing according to the first embodiment.

FIG. 2 is a view for explaining an overview of image forming processing according to the first embodiment. As the reflection characteristics of an object, three kinds of characteristics, that is, a specular characteristic, an internal diffuse characteristic, and a surficial diffuse characteristic are obtained. Then, the color signal values (color material amounts for respective positions) of a color material layer as the first recording layer are calculated based on the internal diffuse characteristic. In addition, the color signal values (clear ink amounts for respective positions) of a shape layer as the second recording layer are calculated based on the specular characteristic and the surficial diffuse characteristic. Lastly, based on the calculated color signal values, a forming unit forms the color material layer and the shape layer. This makes it possible to reproduce the reflection characteristics of the object more correctly.

Apparatus Arrangement

Figure 4:
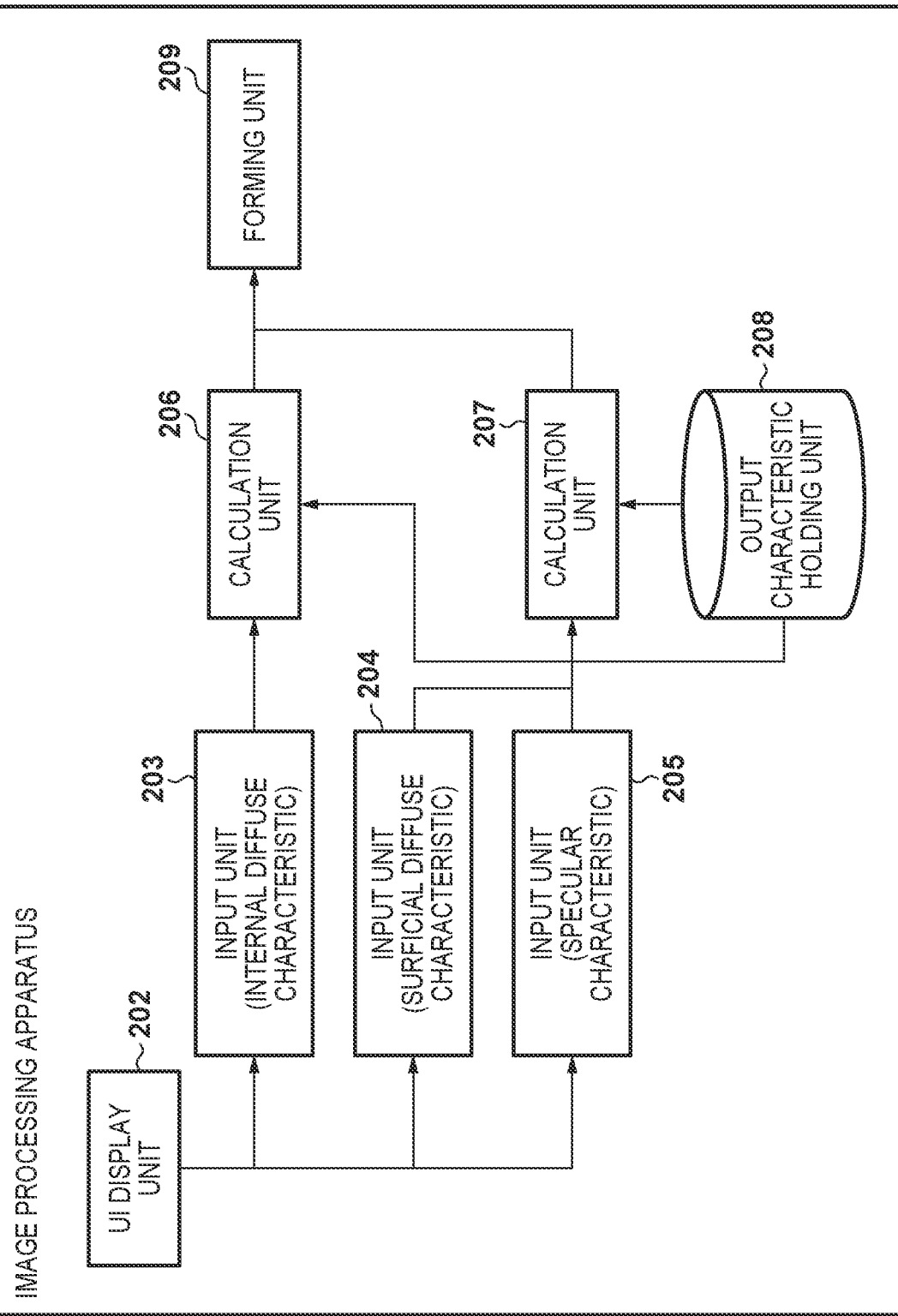
FIG. 4 is a block diagram showing the functional arrangement of the image processing apparatus according to the first embodiment.

FIG. 4 is a block diagram showing the functional arrangement of an image processing apparatus according to the first embodiment. An image processing apparatus 201 includes a user interface (UI) display unit 202, input units 203 to 205, calculation units 206 and 207, an output characteristic holding unit 208, and a forming unit 209.

The UI display unit 202 is a functional unit for displaying a user interface screen to receive an instruction input from a user. The input units 203 to 205 are functional units for obtaining the internal diffuse characteristic, surficial diffuse characteristic, and specular characteristic of an object, respectively. For example, each characteristic is obtained based on an instruction input from the user via the UI screen.

The calculation unit 206 is a functional unit for deriving the color signal values (color material ink amounts for respective positions) of the color material layer based on the internal diffuse characteristic. The calculation unit 207 is a functional unit for deriving the color signal values (clear ink amounts for respective positions) of the shape layer based on the surficial diffuse characteristic and the specular characteristic. The output characteristic holding unit 208 holds the output characteristic data of the forming unit 209. The forming unit 209 is a functional unit for forming an image based on designated color signal values. In this example, the forming unit 209 forms an image based on the color signal values of the color material layer and the shape layer, that have been calculated by the calculation units 206 and 207.

Figure 3:
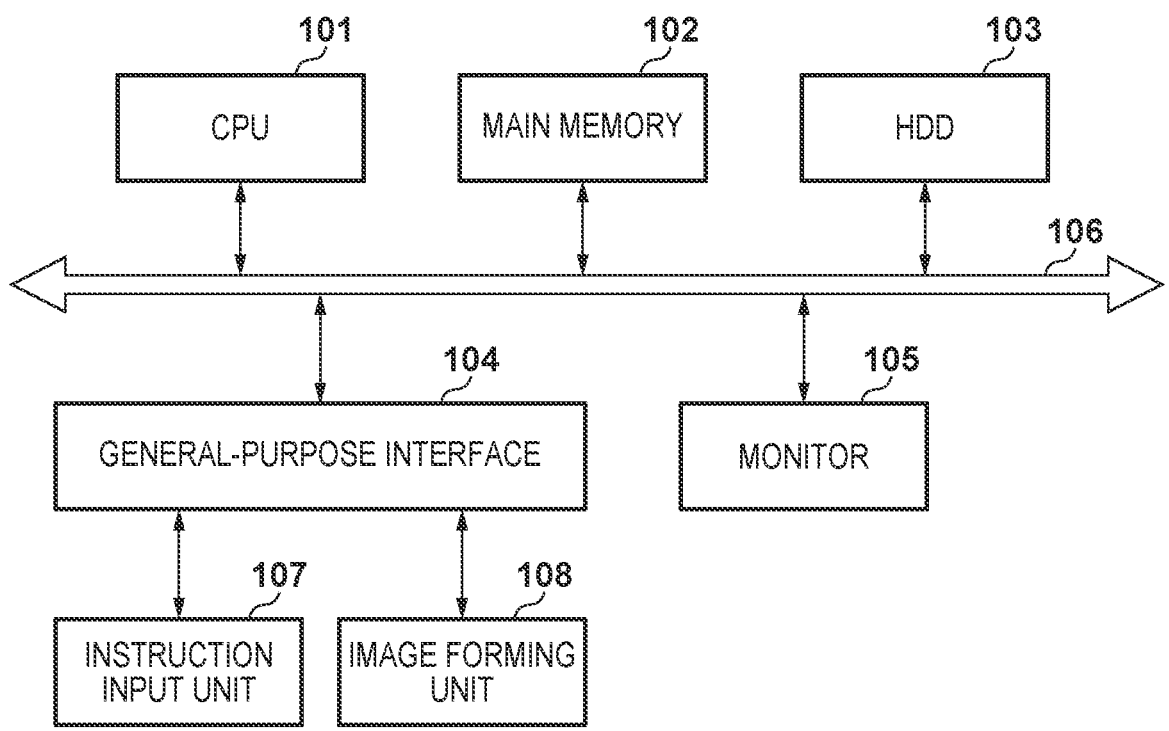
FIG. 3 is a block diagram showing the hardware arrangement of an image processing apparatus according to the first embodiment.

FIG. 3 is a block diagram showing the hardware arrangement of the image processing apparatus 201. The image processing apparatus 201 includes a CPU 101, a main memory 102, an HDD 103, a general-purpose interface (I/F) 104, a monitor 105, a main bus 106, an instruction input unit 107, and an image forming unit 108.

The general-purpose I/F 104 is, for example, a universal serial bus (USB). Alternatively, a communication interface such as Ethernet® may be used. The instruction input unit 107 is a device such as a keyboard and mouse for accepting an operation from the user. The instruction input unit 107 may be formed as a touch panel display integrated with the monitor 105.

A form in which the respective functional units of the image processing apparatus 201 shown in FIG. 4 are implemented when the CPU 101 executes software programs will be described below. However, some or all of the functional units of the image processing apparatus 201 may be processed by hardware such as an application specific integrated circuit (ASIC) or FPGA. Note that FPGA is an abbreviation for field programmable gate array.

In response to a user instruction to the instruction input unit 107, the CPU 101 activates an image processing application stored in the HDD 103. The CPU 101 displays a user interface screen on the monitor 105 while loading the image processing application into the main memory 102. Subsequently, various data stored in the HDD 103 are transferred to the main memory 102 based on a command from the CPU 101. The various data transferred to the main memory 102 undergo predetermined calculation processing in response to a command from the CPU 101. The result of the calculation processing is displayed on, for example, the monitor 105 or output to the image forming unit 108.

Operation of Apparatus

FIG. 5 is a flowchart illustrating processing executed by the image processing apparatus 201 according to the first embodiment.

In step S1, the UI display unit 202 displays a user interface screen for accepting, from the user, information necessary for image processing.

FIG. 6 is a view showing an example of the user interface screen displayed on the UI display unit 202. A user input portion 301 is used to instruct and input the reflection characteristic files of a target object to be printed out by the image processing apparatus 201. As described above, in the first embodiment, the reflection characteristics include the three kinds of characteristics, that is, the internal diffuse characteristic, surficial diffuse characteristic, and specular characteristic.

FIGS. 7A to 7C are tables each showing an example of the characteristic file. An example will be described in which the three kinds of characteristics are saved as individual files and the user designates the files via the user input portion 301. However, the three kinds of characteristics may be managed as one file. Note that a method of obtaining the three kinds of characteristics (internal diffuse characteristic, surficial diffuse characteristic, and specular characteristic) will be described later.

A display portion 302 visualizes and displays the reflection characteristics of the object instructed and input by the user. An output button 303 is a button used to execute image forming processing. An end button 304 is a button used to end the processing related to image formation and close the user interface. When the user performs an instruction/input operation in the user input portion 301, and instructs the pressing of the output button 303, the process advances to step S2.

In step S2, the input unit 203 obtains the internal diffuse characteristic (Xi, Yi, Zi) of the target object in accordance with the reflection characteristic file name instructed and input by the user. As shown in FIG. 7A, the internal diffuse characteristic file holds the internal diffuse characteristic (CIE tristimulus values X, Y, and Z) for each position of the target object and additional information such as a pixel count, a pixel size, and the kind of a measurement light source. The input unit 203 obtains all the pieces of information.

In step S3, the input unit 204 obtains the surficial diffuse characteristic (X1, Y1, Z1) of the target object in accordance with the file name instructed and input by the user. The obtained surficial diffuse characteristic may be obtained for each reflection angle. However, in this example, the surficial diffuse characteristic is almost isotropic, and the surficial diffuse characteristic for a predetermined angle (for example, 45° or 0°) is described in the file.

In step S4, the input unit 205 obtains the specular characteristic (Xs, Ys, Zs) of the target object in accordance with the file name instructed and input by the user.

In step S5, the calculation unit 206 calculates the color signal values (CMYK color material amounts) of the color material layer based on the internal diffuse characteristic of the target object obtained in step S2. Detailed processing of the calculation unit 206 will be described later. In step S6, the calculation unit 207 calculates the color signal values (clear color material amounts) of the shape layer based on the surficial diffuse characteristic of the target object obtained in step S3 and the specular characteristic obtained in step S4. Detailed processing of the calculation unit 207 will be described later. In step S7, the forming unit 209 forms a printed material based on the color material amounts calculated in steps S4 and S5.

Figure 8:
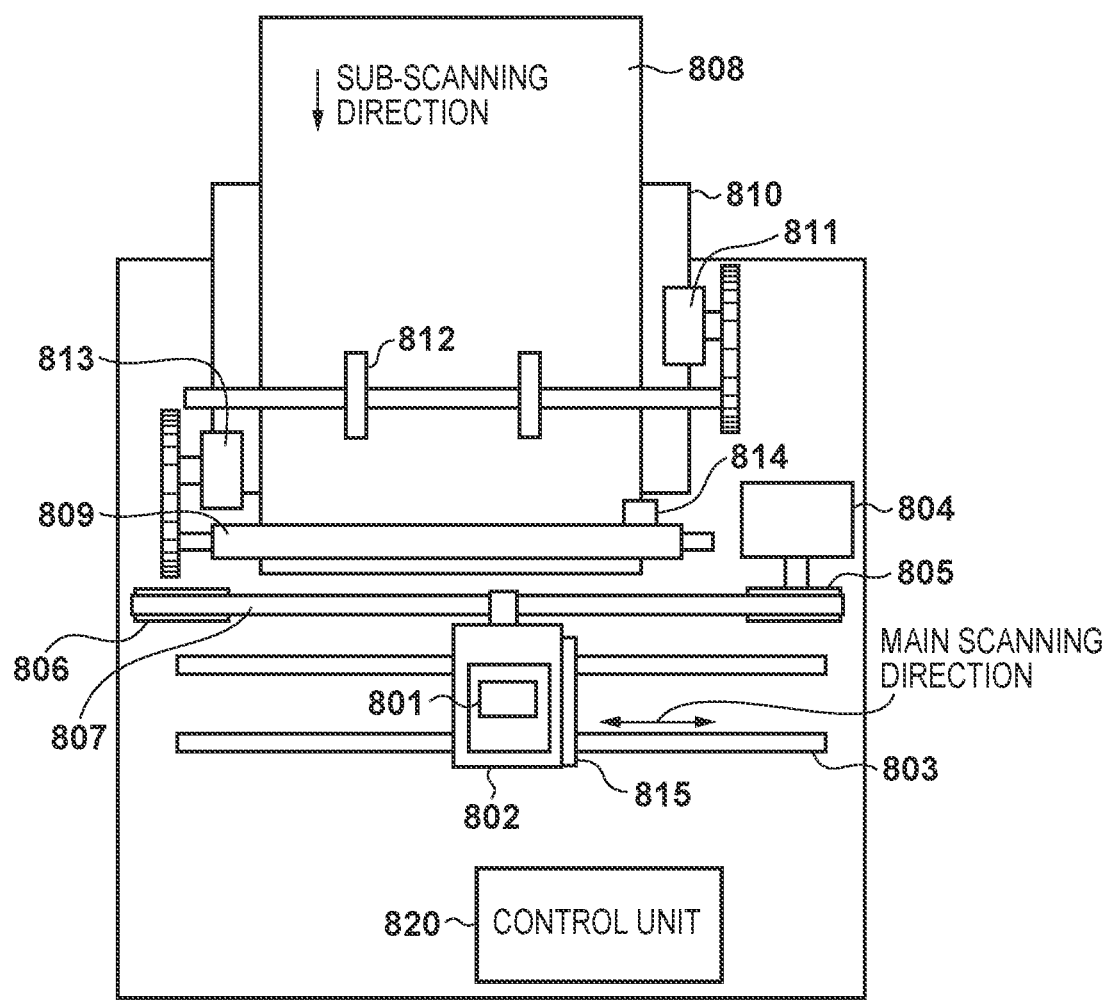
FIG. 8 is a view showing an example of the arrangement of a forming unit 209.

FIG. 8 is a view showing an example of the arrangement of the forming unit 209. Although an image forming unit adopting an inkjet method will be described, another recording method may be used.

A head cartridge 801 includes a recording head formed from a plurality of orifices, and ink tanks for supplying inks to the recording head. Furthermore, the head cartridge 801 is provided with a connector for receiving a signal that drives each orifice of the recording head or the like. Six kinds of ink tanks in total of clear ink for forming a transparent layer, white ink for controlling a scattering characteristic, and C (cyan), M (magenta), Y (yellow), and K (black) inks for color control are individually provided.

The head cartridge 801 is positioned and mounted replaceably on a carriage 802, and the carriage 802 is provided with a connector holder for transmitting a driving signal or the like to the head cartridge 801 via the connector. The carriage 802 can reciprocally move along a guide shaft 803. More specifically, the carriage 802 is driven by using a main scanning motor 804 as a driving source via driving mechanisms such as a motor pulley 805, a driven pulley 806, and a timing belt 807, and its position and movement are controlled. Note that the movement of the carriage 802 along the guide shaft 803 will be referred to as "main scanning" hereinafter and the moving direction will be referred to as a "main scanning direction" hereinafter.

Recording media 808 such as transmission films for printing are placed on an auto sheet feeder (ASF) 810. At the time of image formation, driving of a feeding motor 811 rotates a pickup roller 812 via a gear, thereby separating and feeding the recording media 808 one by one from the ASF 810. Furthermore, each recording medium 808 is conveyed to a recording start position facing the orifice surface of the head cartridge 801 on the carriage 802 by rotation of a conveyance roller 809. The conveyance roller 809 is driven via a gear using a line field (LF) motor 813 as a driving source. When the recording medium 808 passes through a paper end sensor 814, it is determined whether the recording medium 808 has been fed and a position at the time of feeding is confirmed. In the head cartridge 801 mounted on the carriage 802, the orifice surface is held to protrude downward from the carriage 802 and to be parallel to the recording medium 808.

A control unit 820 controls the operation of each part of the forming unit 209. For descriptive convenience, the following description assumes that the forming unit 209 is a binary printer that controls whether to discharge ink at a predetermined resolution. A method capable of modulating the sizes of ink droplets to be discharged may be used, as a matter of course.

An image forming operation will be described below. If the recording medium 808 is conveyed to the predetermined recording start position, the carriage 802 moves on the recording medium 808 along the guide shaft 803, and ink is discharged from the orifices of the recording head during the movement. If the carriage 802 moves to one end of the guide shaft 803, the conveyance roller 809 conveys the recording medium 808 by a predetermined amount in a direction perpendicular to the scanning direction of the carriage 802. This conveyance of the recording medium 808 will be referred to as "feeding" or "sub-scanning" hereinafter, and the conveyance direction will be referred to as a "feeding direction" or "sub-scanning direction" hereinafter. When the conveyance of the recording medium 808 by the predetermined amount ends, the carriage 802 moves again along the guide shaft 803. In this way, scanning and feeding by the carriage 802 of the recording head are repeated to form a subsurface scattering control layer and an image on the recording medium.

Note that if UV-curing ink is used, irradiation with ultraviolet rays is performed after each ink is discharged. Note that the recording medium need only be a medium that can support image formation by the recording head.

Operation (S5) of Calculation Unit 206

Figure 9:
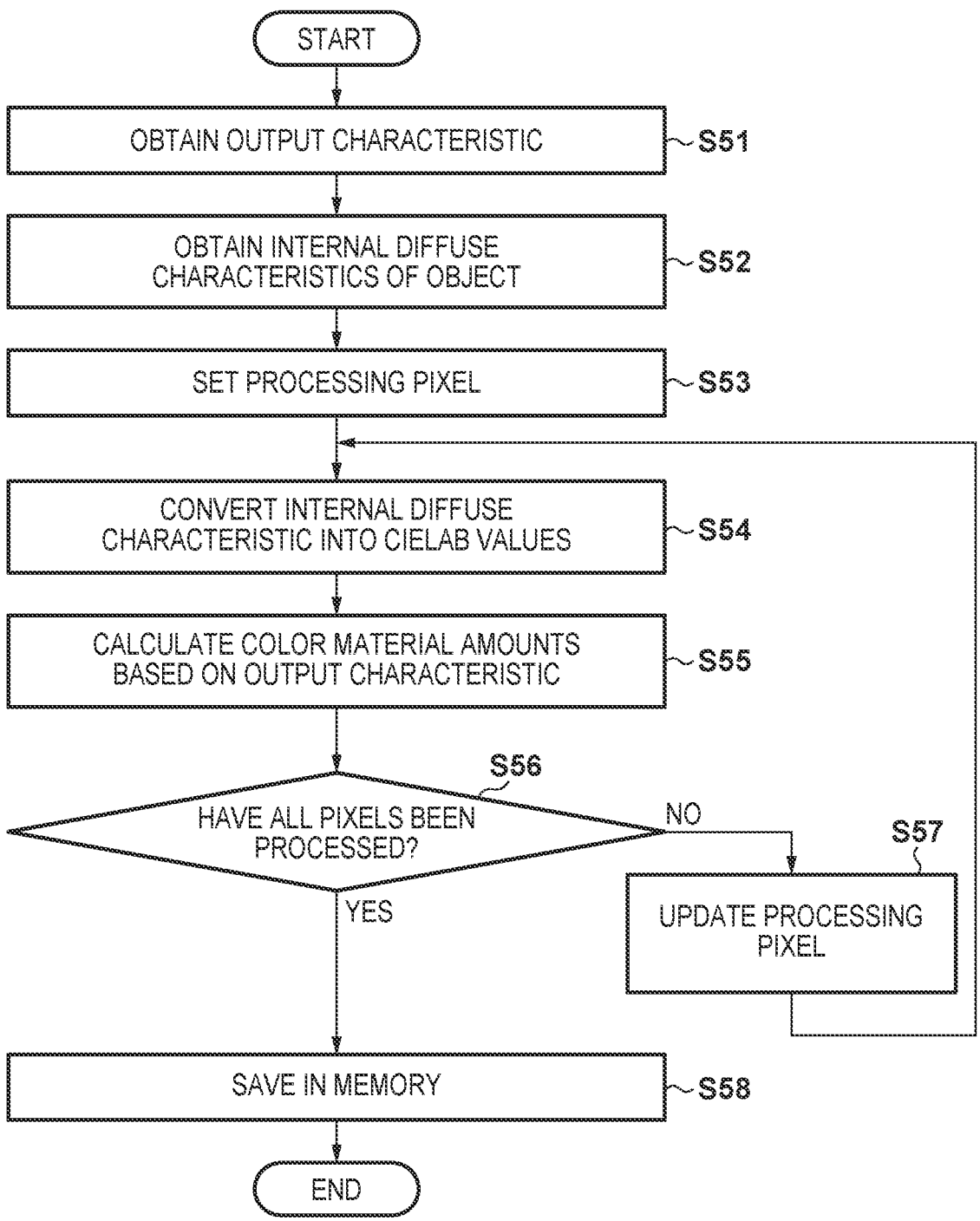
FIG. 9 is a flowchart illustrating color material amount calculation processing executed by a calculation unit 206.

FIG. 9 is a flowchart illustrating the color material amount calculation processing executed by the calculation unit 206.

In step S51, the calculation unit 206 obtains the color output characteristic of the forming unit 209 held in the output characteristic holding unit 208. The color output characteristic is, for example, data obtained by recording, in a format of a look up table (LUT), CIELAB values obtained when the amounts of the respective color materials provided in the forming unit 209 are changed and output. FIG. 10 shows an example of the color output characteristic described in the LUT obtained in step S51.

In step S52, the calculation unit 206 obtains the internal diffuse characteristics of the object. In step S53, the calculation unit 206 sets a pixel j as a processing target among the internal diffuse characteristics for the respective positions of the object obtained in step S52.

In step S54, the calculation unit 206 converts the internal diffuse characteristic $(Xi_j, Yi_j, Zi_j)$ of the processing target pixel j into CIELAB values $(L^*, a^*, b^*)$. For the conversion processing, equations (1) below are used.

$$\text{for } \frac{Yi_j}{Yn} > 0.008856, L^* = 116\left(\frac{Yi_j}{Yn}\right)^{1/3} - 16 \quad (1)$$

$$\text{for } \frac{Yi_j}{Yn} \leq 0.008856, L^* = 903.29 \frac{Yi_j}{Yn}$$

-continued $$a^* = 500\left[f\left(\frac{Xi_j}{Xn}\right) - f\left(\frac{Yi_j}{Yn}\right)\right]$$

$$b^* = 200\left[f\left(\frac{Yi_j}{Yn}\right) - f\left(\frac{Zi_j}{Zn}\right)\right]$$

$$\text{for } \frac{Xi_j}{Xn} = 0.008856, f\left(\frac{Xi_j}{Xn}\right) = \left(\frac{Xi_j}{Xn}\right)^{1/3}$$

$$\text{for } \frac{Xi_j}{Xn} \leq 0.008856, f\left(\frac{Xi_j}{Xn}\right) = 7.78 \frac{Xi_j}{Xn} + \frac{16}{116}$$

$$\text{for } \frac{Yi_j}{Yn} = 0.008856, f\left(\frac{Yi_j}{Yn}\right) = \left(\frac{Yi_j}{Yn}\right)^{1/3}$$

$$\text{for } \frac{Yi_j}{Yn} \leq 0.008856, f\left(\frac{Yi_j}{Yn}\right) = 7.78 \frac{Yi_j}{Yn} + \frac{16}{116}$$

$$\text{for } \frac{Zi_j}{Zn} = 0.008856, f\left(\frac{Zi_j}{Zn}\right) = \left(\frac{Zi_j}{Zn}\right)^{1/3}$$

$$\text{for } \frac{Zi_j}{Zn} \leq 0.008856, f\left(\frac{Zi_j}{Zn}\right) = 7.78 \frac{Zi_j}{Zn} + \frac{16}{116}$$

where $X_n$, $Y_n$, and $Z_n$ respectively represent the CIE tristimulus values X, Y, and Z of a white point. Assume that the values of the measurement light source obtained as the additional information of the internal diffuse characteristic are used.

In step S55, the calculation unit 206 calculates color material amounts for reproducing the internal diffuse characteristic (CIELAB values) of the target pixel by reverse interpolation with reference to the output characteristic of the forming unit 209 obtained in step S51. As a method of reverse interpolation from the LUT, for example, a known method such as tetrahedral interpolation or cubic interpolation is used and a description thereof will be omitted.

In step S56, the calculation unit 206 determines whether all the pixels have been processed. If not all the pixels have been processed, the process advances to step S57, and the calculation unit 206 updates the processing target pixel, thereby returning to step S54. If all the pixels have been processed, the process advances to step S58, and the calculation unit 206 saves the obtained color material amounts for the respective positions in the memory, thereby ending the processing.

Operation (S6) of Calculation Unit 207

Figure 11:
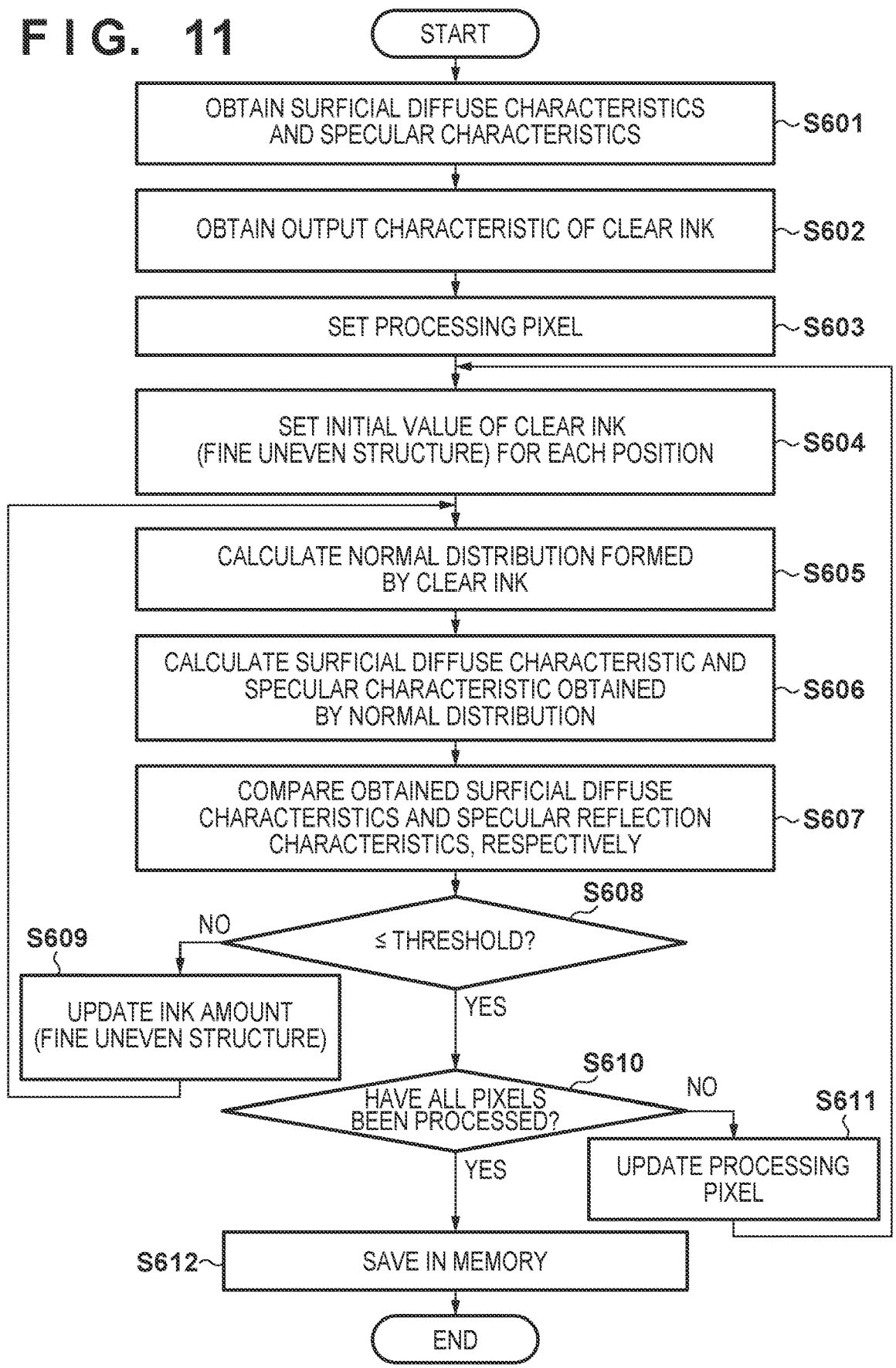
FIG. 11 is a flowchart illustrating clear ink amount calculation processing executed by a calculation unit 207.

FIG. 11 is a flowchart illustrating the clear ink amount calculation processing executed by the calculation unit 207.

In step S601, the calculation unit 207 obtains the surficial diffuse characteristics and specular characteristics of the object. In step S602, the calculation unit 207 obtains the shape output characteristic of the clear ink of the forming unit 209 held in the output characteristic holding unit 208. The shape output characteristic is, for example, height data obtained when the amount of the clear ink provided in the forming unit 209 is changed and output.

FIG. 12 is a table showing the correspondence between an ink discharge count and a height (thickness). Note that the forming unit 209 has a function of discharging UV-curing clear ink and a function of performing irradiation with ultraviolet rays, and discharge of the clear ink and irradiation with ultraviolet rays are repeated to form a height structure.

In step S603, the calculation unit 207 sets the pixel j as a processing target among the surficial diffuse characteristics and specular characteristics for the respective positions of the object obtained in step S601. In step S604, the calculation unit 207 sets the initial value of the clear ink amount for the processing target pixel j. Assume that the pixel size of the obtained surficial diffuse characteristic/specular characteristic is 75 µm, and the dot size (horizontal direction) of the clear ink of the forming unit 209 is 15 µm. In this case, the processing target pixel j can be divided into 5×5 regions and then the clear ink can be discharged. Thus, the initial value of the clear ink amount is set for each of the 5×5 divided regions.

Figure 13A:
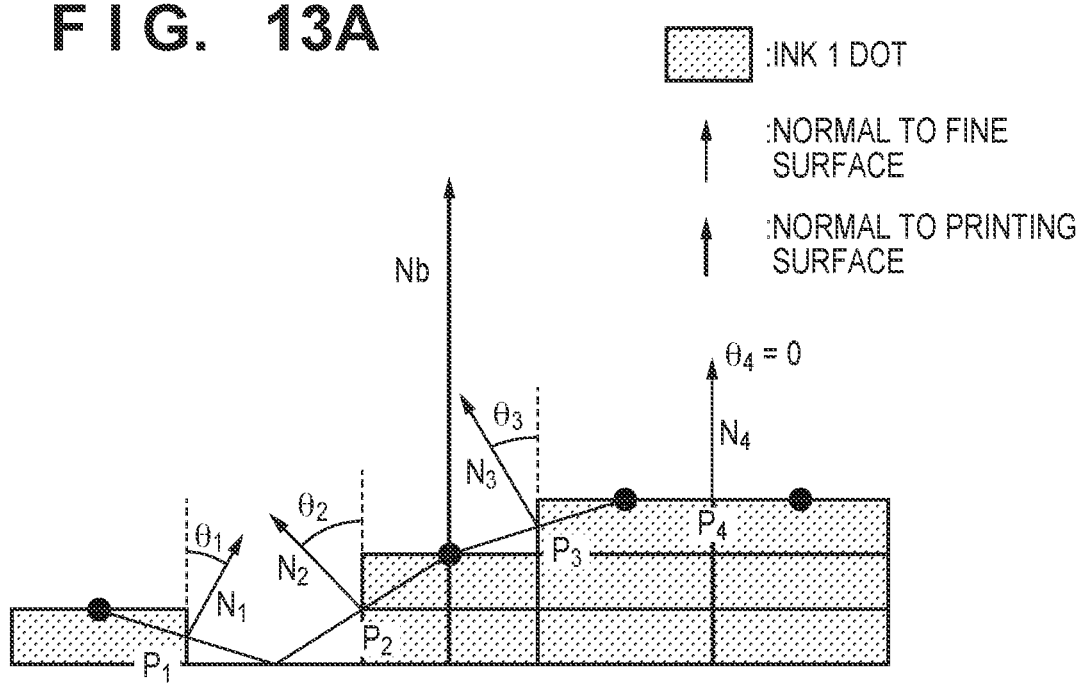
FIG. 13A is a view for explaining normals formed by clear ink.

In step S605, the calculation unit 207 calculates a normal distribution formed by the clear ink. FIG. 13A is a view for explaining normals formed by the clear ink. More specifically, FIG. 13A exemplarily shows the relationship between the normal and the clear ink amount for each divided region. However, for descriptive convenience, a two-dimensional view is used.

As shown in FIG. 13A, the clear ink amount is set for each divided region, and the height of each region can be calculated based on the shape output characteristic obtained in step S603. At this time, in consideration of a fine surface $P_k$ formed with an adjacent region, a normal Nk to the fine surface $P_k$ is calculated.

Figure 13B:
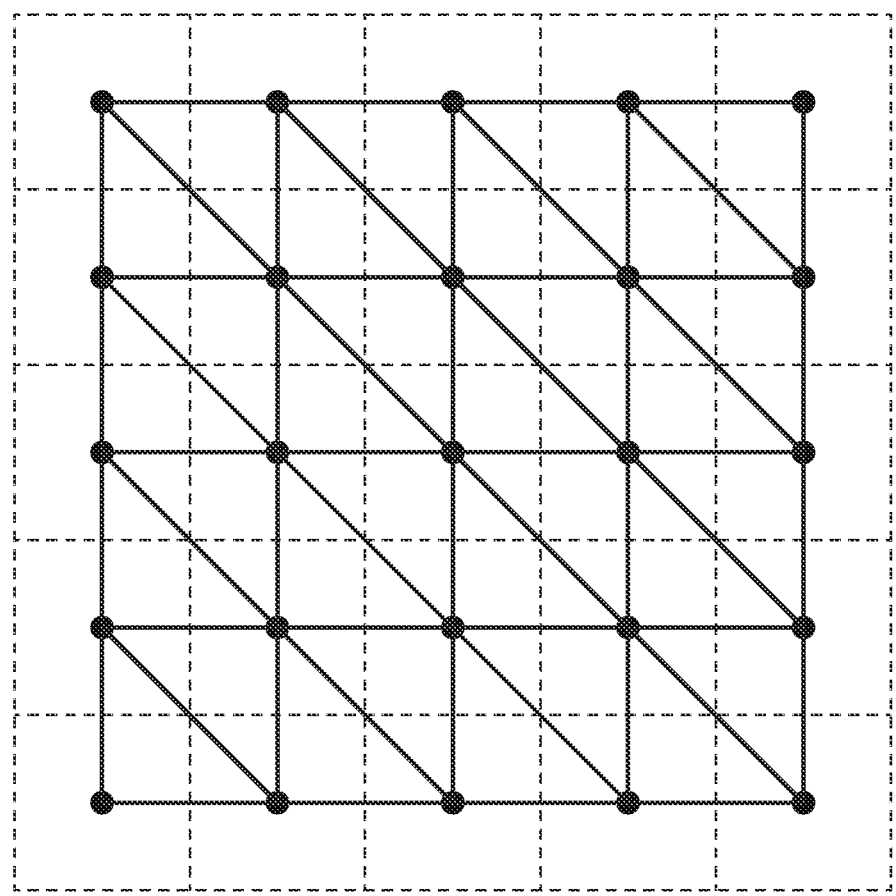
FIG. 13B is a view for explaining a fine surface in a pixel.

FIG. 13B is a view for explaining the fine surface $P_k$ in the pixel j. To calculate each surface normal formed by two adjacent regions and three points, the normals $N_k$ to the 32 fine surfaces $P_k$ as triangles indicated by solid lines in FIG. 13B are calculated (k=32). Note that calculation of a surface normal from the coordinates of three points is apparent, and a description thereof will be omitted.

In step S606, based on the normals $N_k$ calculated in step S605, the calculation unit 207 calculates the surficial diffuse characteristic and specular characteristic obtained by the set clear ink amount. More specifically, letting $\theta_k$ be a solid angle formed by a normal Nb to the entire printing surface indicated by a thick arrow in FIG. 13A and the normal $N_k$ to each fine surface, the surficial diffuse characteristic and specular characteristic are calculated by equations (2) below.

$$\begin{cases} Xl_{cl} = X_n R(\theta_k) P(\theta_k \leq \theta_T)/\theta_T \\ Yl_{cl} = Y_n R(\theta_k) P(\theta_k \leq \theta_T)/\theta_T \\ Zl_{cl} = Z_n R(\theta_k) P(\theta_k \leq \theta_T)/\theta_T \end{cases} \quad (2)$$

$$\begin{cases} Xs_{cl} = X_n R(\theta_k)(1 - P(\theta_k \leq \theta_T))/(2\pi - \theta_T) \\ Ys_{cl} = Y_n R(\theta_k)(1 - P(\theta_k \leq \theta_T))/(2\pi - \theta_T) \\ Zs_{cl} = Z_n R(\theta_k)(1 - P(\theta_k \leq \theta_T))/(2\pi - \theta_T) \end{cases}$$

where ($Xl_{cl}$, $Yl_{cl}$, $Zl_{cl}$) represent the surficial diffuse characteristic obtained by the set clear ink amount. ($Xs_{cl}$, $Ys_{cl}$, $Zs_{cl}$) represent the specular characteristic obtained by the set clear ink amount. ($X_n$, $Y_n$, $Z_n$) represent the X, Y, and Z values of the measurement light source that has measured the target object.

Furthermore, $\theta_T$ represents a threshold of the normal direction (solid angle). $P(\theta_k \leq \theta_T)$ represents the probability that $\theta_k \leq \theta_T$ is satisfied. $R(\theta_k)$ represents the reflectance of the clear ink surface.

The reflectance $R(\theta_k)$ is a value that varies depending on the incident angle of light and the refractive index of the clear ink, and can be calculated from the Fresnel equation. Note that on the right-hand side of each of equations (2), the intensity of the light reflected in the specular reflection direction or the diffuse reflection direction is divided by a unit solid angle.

In step S607, the calculation unit 207 calculates an evaluation value E for comparing the surficial diffuse characteristic/specular characteristic obtained by the clear ink, that has been calculated in step S606, with the surficial diffuse characteristic/specular characteristic obtained in step S601. For example, equation (3) below is used.

$$E = \sqrt{(Xl_{cl}-Xl_j)^2 + (Yl_{cl}-Yl_j)^2 + (Zl_{cl}-Zl_j)^2} + \sqrt{(Xs_{cl}-Xs_j)^2 + (Ys_{cl}-Ys_j)^2 + (Zs_{cl}-Zs_j)^2} \quad (3)$$

where ($Xl_j$, $Yl_j$, $Zl_j$) represent the surficial diffuse characteristic of the target object in the pixel j. ($Xs_j$, $Ys_j$, $Zs_j$) represent the specular characteristic of the target object in the pixel j.

In step S608, the calculation unit 207 determines whether the calculated evaluation value E is equal to or smaller than a predetermined threshold. If the evaluation value E is larger than the threshold, the process advances to step S609 to update the clear ink amount for each position, and then returns to step S605; otherwise, the process advances to step S610. Note that in the processes in steps S605 to S609, for example, an optimization method such as a Newton method or steepest descent method is preferably used.

In step S610, the calculation unit 207 determines whether all the pixels have been processed. If not all the pixels have been processed, the process advances to step S611 to update the processing target pixel, and then returns to step S604; otherwise, the process advances to step S612, and the calculation unit 207 saves the obtained clear ink amounts for the respective positions in the memory, thereby ending the process.

Figure 14A:
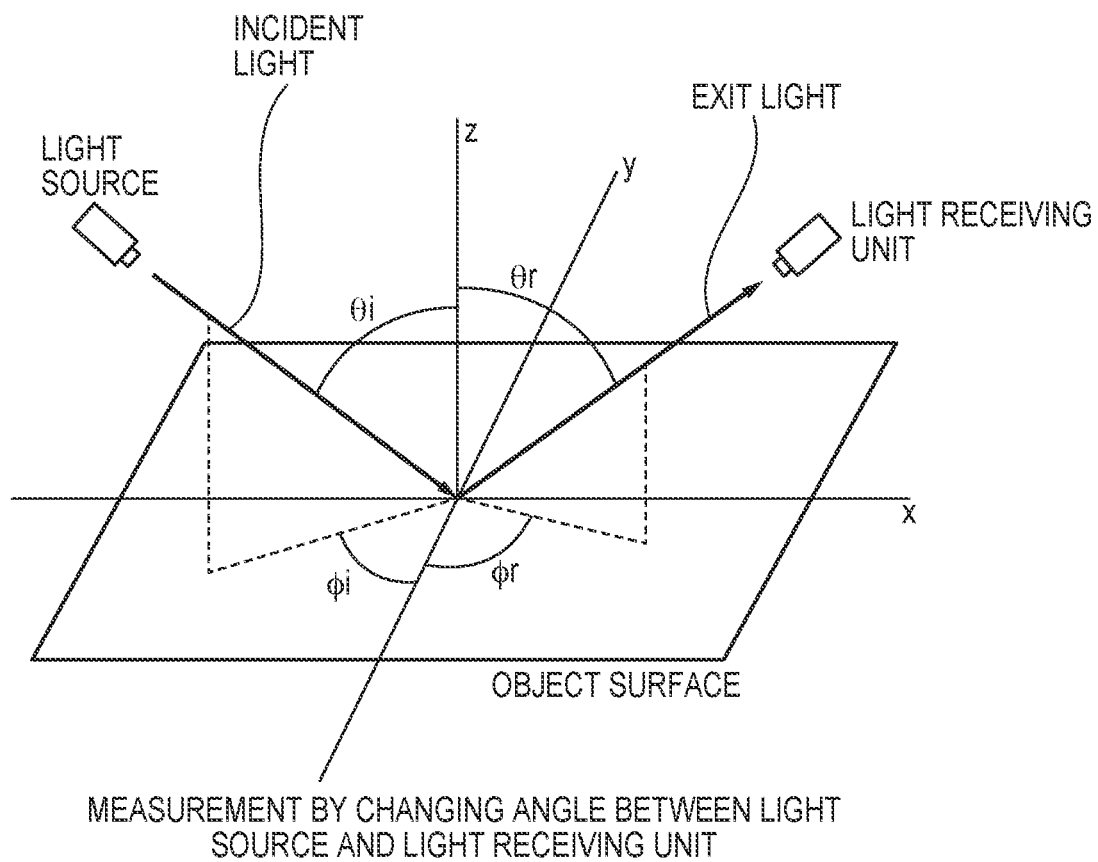
FIG. 14A is a view for explaining a method of measuring reflected light by a measurement unit.
Figure 14B:
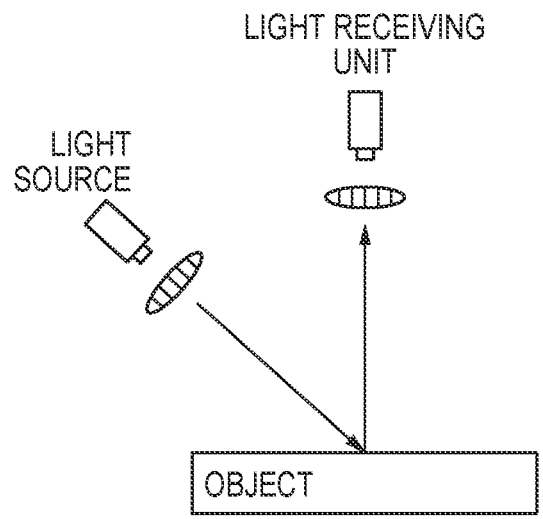
FIG. 14B is a view for explaining measurement when polarizing filters in a light source and a light receiving unit are parallel to each other.
Figure 14C:
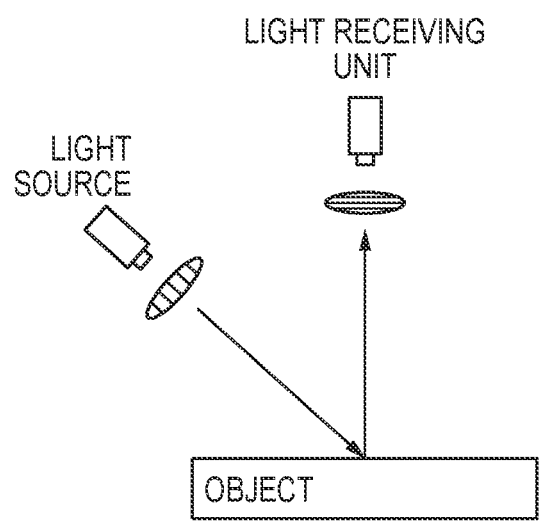
FIG. 14C is a view for explaining measurement when polarizing filters in the light source and the light receiving unit are orthogonal to each other.

Method of Measuring Internal Diffuse Characteristic/Surficial Diffuse Characteristic/Specular Characteristic A method of measuring the three kinds of reflection characteristics (internal diffuse characteristic/surficial diffuse characteristic/specular characteristic) to be input according to this embodiment will be described below. FIGS. 14A to 14C are views for explaining a method of measuring reflected light by a measurement unit. FIG. 15 is a table exemplifying a measurement file.

In the measurement file, an incident elevation angle ($\theta_i$) and a light receiving elevation angle ($\theta_r$) represent the incident direction of light on a sample surface (object) and a light receiving direction in a light receiving unit, respectively. These angles are defined, as shown in FIG. 14A. Note that the incident elevation angle of the light source is fixed to 45°, and the light receiving elevation angle of the light receiving unit is changed from −60° to 60° every 5°. Reflected light for each incident azimuth ($\phi_i$) and each light receiving azimuth ($\phi_r$) may be additionally measured or measurement values measured using different steps under different angle conditions may be described in the measurement file.

XYZ tristimulus values obtained when measuring reflected light under the above-described angle conditions are described as XYZ (parallel) and X'Y'Z' (orthogonal). Especially, measurement values obtained when polarizing filters on the light source side and the light receiving side are parallel to each other, as shown in FIG. 14B, are described as XYZ (parallel). On the other hand, measurement values obtained when polarizing filters on the light source side and the light receiving side are orthogonal to each other, as shown in FIG. 14C, are described as X'Y'Z' (orthogonal).

As for XYZ (parallel), measurement values at an angle in the specular reflection direction in which the light source is reflected represent the characteristic of the specular reflection light, and measurement values at an angle other than the specular reflection direction represent the characteristic of the diffuse reflection light. The measurement values as X'Y'Z' (orthogonal) represent the characteristic of the internal diffuse reflection light. Note that in addition to the reflected light, the half width of the reflected light or information of an angle at which the reflected light has an intensity equal to that of the diffuse reflection light may be obtained and held as the characteristic of the specular reflection light.

FIG. 16 is a graph for explaining the correspondence between three kinds of reflected light components and the measurement values. More specifically, FIG. 16 schematically shows the luminance when the object is measured while changing the angle, in which the abscissa represents the angle and the ordinate represents a reflection luminance. The measurement values of XYZ (parallel) described in the measurement file correspond to a solid circle in FIG. 16, and the measurement values of X'Y'Z' (orthogonal) correspond to an open circle in FIG. 16.

The characteristic of the specular reflection light is calculated by subtracting XYZ (parallel) at an angle other than the specular reflection direction from XYZ (parallel) of the reflected light at an angle in the specular reflection direction. In addition, surficial diffuse reflection is calculated by subtracting X'Y'Z' (orthogonal) from XYZ (parallel) at an angle other than the specular reflection direction. In this way, the three kinds of characteristics can be separated by calculation.

As described above, according to the first embodiment, three reflection characteristics (specular reflection light, internal diffuse reflection light, and surficial diffuse reflection light) are used for image formation. More specifically, the color material amounts of the color material layer are calculated based on the internal diffuse characteristic of the object, and the color material amounts of the shape layer are calculated based on the specular characteristic/surficial diffuse characteristic. This makes it possible to create a printed material capable of reproducing the reflection characteristics of the object more correctly.

According to the present invention, it is possible to provide an image forming technique capable of reproducing the material appearance of an object more correctly.

Second Embodiment

The second embodiment will describe a form in which the area ratio of a plurality of basic structures (uneven structures) that can be formed by a forming unit 209 are controlled based on the ratio between the specular characteristic and the surficial diffuse characteristic of an object. Note that the arrangement of an image processing apparatus is the same as in the first embodiment and a description thereof will be omitted. Processing (step S6) of a calculation unit 207 is mainly different from the first embodiment. The processing in step S6 will be described below and a description of the remaining processes will be omitted.

Operation of Calculation Unit 207 (S6)

Figure 17:
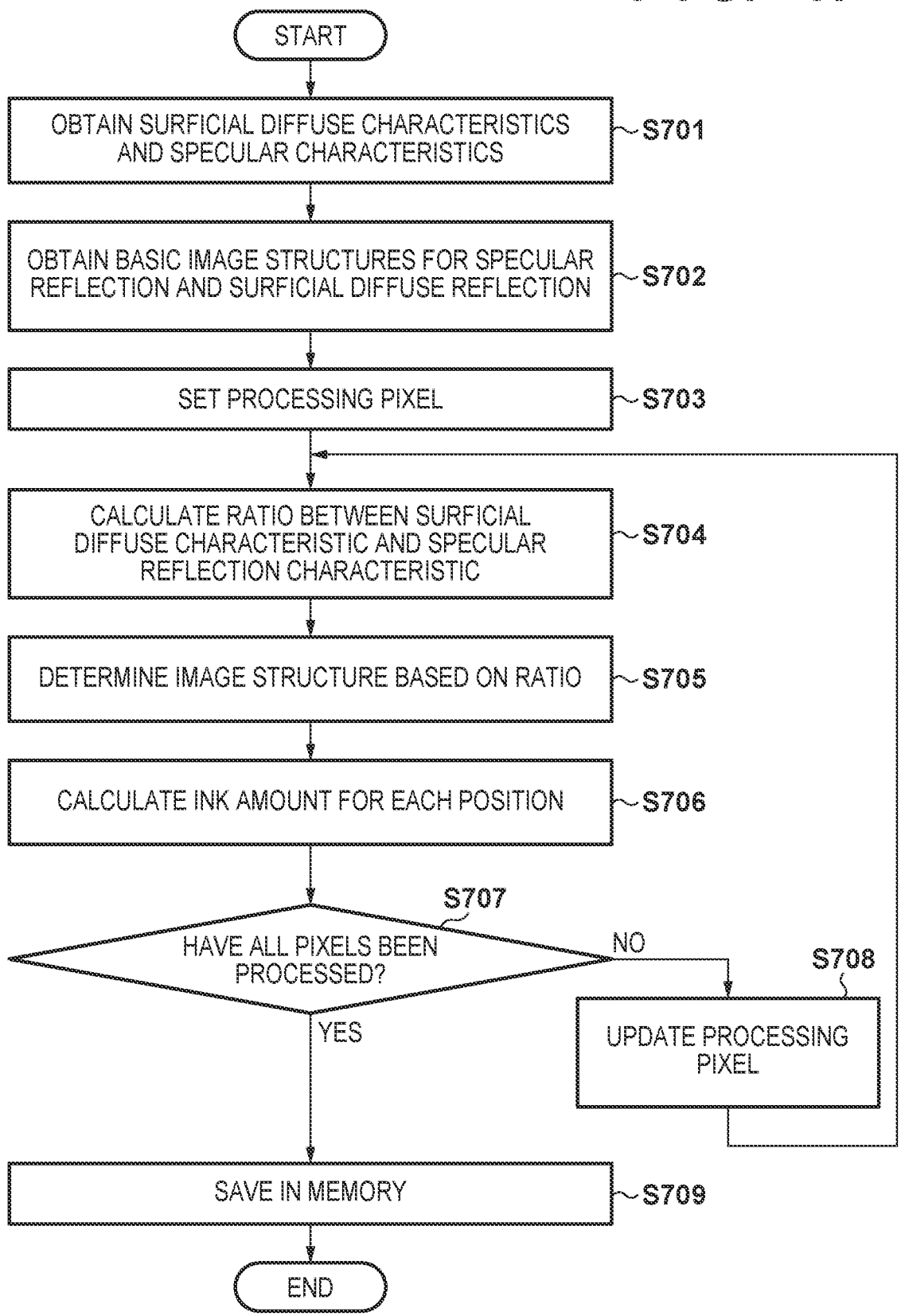
FIG. 17 is a flowchart illustrating clear ink amount calculation processing executed by a calculation unit 207 according to the second embodiment.

FIG. 17 is a flowchart illustrating clear ink amount calculation processing executed by the calculation unit 207 according to the second embodiment.

In step S701, the calculation unit 207 obtains the surficial diffuse characteristics and specular characteristics of an object. In step S702, the calculation unit 207 obtains basic structures that can be formed by the forming unit 209 and are held in an output characteristic holding unit 208.

Figure 18A:
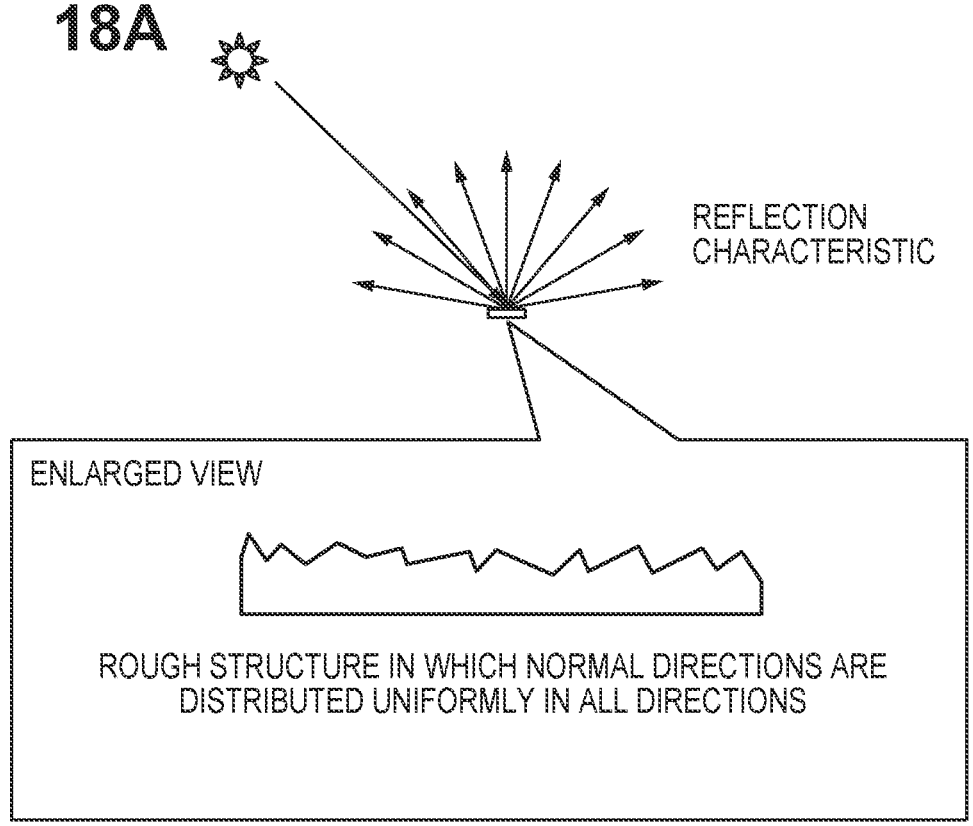
FIG. 18A is a view for explaining a basic structure for surficial diffuse control formed by a forming unit 209.
Figure 18B:
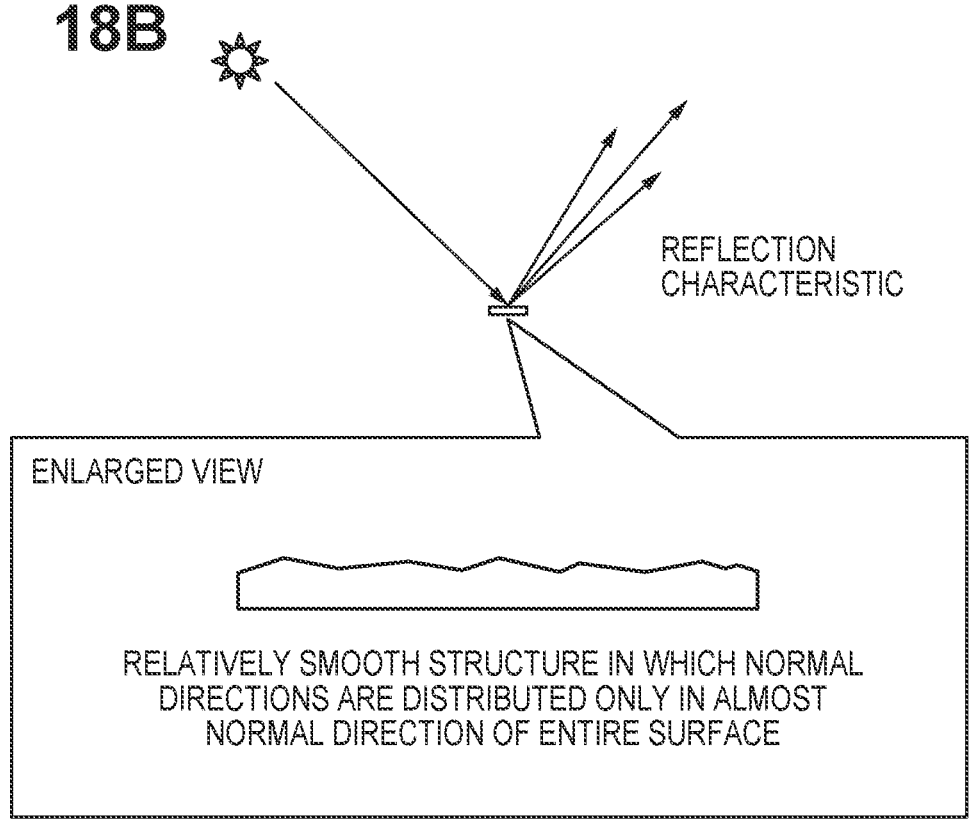
FIG. 18B is a view for explaining a basic structure for specular control formed by the forming unit 209.

FIGS. 18A and 18B are views each for explaining the basic structure of an image surface formed by the forming unit 209. FIG. 18A shows a basic structure for controlling surficial diffuse. For example, the basic structure is a structure in which normal directions are distributed uniformly and randomly in all directions. If light enters this basic structure, reflected light is diffused almost uniformly in all direction, like a so-called perfect diffuse reflecting plate.

On the other hand, FIG. 18B shows a relatively smooth basic structure, and a structure in which normal directions are distributed only in the normal direction of a printing surface. If light enters this structure, the structure reflects intense light in the specular reflection direction of the printing surface.

In step S702 described above, a plurality of basic structures that can be formed by the forming unit 209 are obtained. The following description assumes that the two basic structures shown in FIGS. 18A and 18B are obtained.

In step S703, the calculation unit 207 sets a pixel j as a processing target among the surficial diffuse characteristics and specular characteristics for respective positions of the object obtained in step S701. In step S704, the calculation unit 207 calculates the ratio between the surficial diffuse characteristic and specular characteristic in the pixel j.

In step S705, the calculation unit 207 determines the arrangement of the basic structures to match the ratio calculated in step S704. That is, the calculation unit 207 determines the arrangement so that the ratio calculated in step S704 matches the area ratio between the above-described two kinds of basic structures. FIG. 19 is a view for explaining a concept of area ratio control of the basic structures.

In step S706, the calculation unit 207 calculates a clear ink amount for each position based on the arrangement of the basic structures determined in step S705. Since the correspondences between the basic structures and the clear ink amounts are determined in advance, it is possible to automatically calculate a clear ink amount for each position after the arrangement of the basic structures is determined.

In step S707, the calculation unit 207 determines whether all the pixels have been processed. If not all the pixels have been processed, the process advances to step S708, and the calculation unit 207 updates the processing target pixel, thereby returning to step S704. If all the pixels have been processed, the process advances to step S709, and the calculation unit 207 saves the obtained clear ink amounts for the respective positions in a memory, thereby ending the processing.

As described above, according to the second embodiment, the area ratio of a plurality of kinds of basic structures formed by the forming unit is controlled based on the ratio between the specular characteristic and surficial diffuse characteristic of an object. This can form a printed material that approximates the reflection characteristics of the object more easily.

Third Embodiment

The third embodiment will describe processing when the surficial diffuse characteristic of an object has angle dependency. Note that the arrangement of an image processing apparatus and the flowchart of the processing are almost the same as in the second embodiment. Processing (step S6) of a calculation unit 207 is mainly different from the second embodiment. The processing in step S6 will be described below and a description of the remaining processes will be omitted.

Figures 20A, 20B:
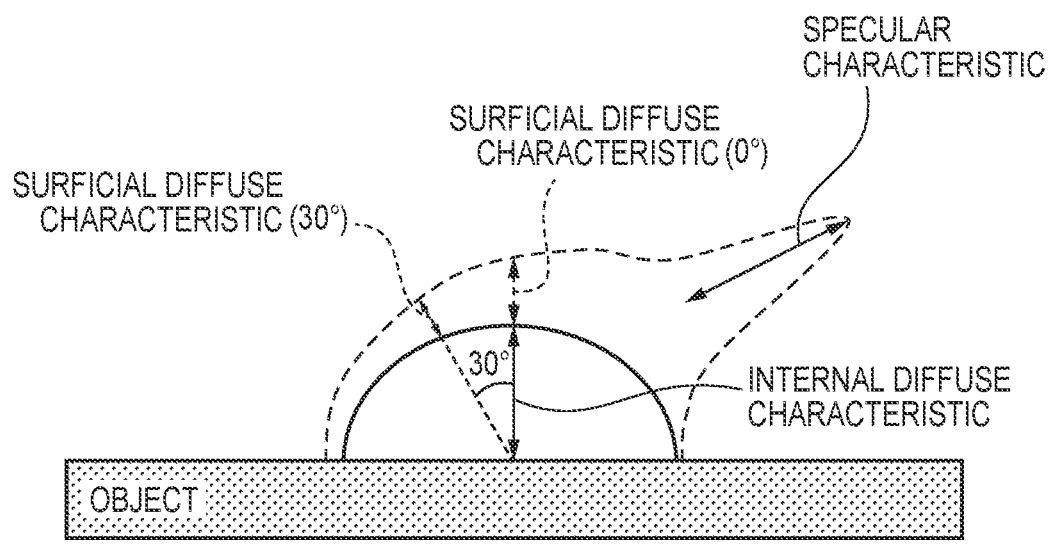
FIG. 20A is a view for explaining a characteristic file used in the third embodiment.
FIG. 20B is a table showing an example of the characteristic file used in the third embodiment.

FIG. 20A is a view for explaining a characteristic file used in the third embodiment, and exemplarily shows an anisotropic surficial diffuse characteristic. FIG. 20B is a table showing an example of the characteristic file. As described above, in the third embodiment, the surficial diffuse characteristic of the object is anisotropic. In this case, surficial diffuse characteristics at a plurality of angles are input to an image processing apparatus 201 via a user input portion 301 of a user interface. For example, in the characteristic file shown in FIG. 20B, characteristics at two angels (0° and 30°) are described.

The calculation unit 207 calculates the clear ink amount of a shape layer based on the input surficial diffuse characteristics at the two angles and an additionally input specular characteristic. That is, although the two basic structures shown in FIGS. 18A and 18B are used in the second embodiment, for example, three basic structures shown in FIGS. 21A to 21C are used in the third embodiment.

Figure 21A:
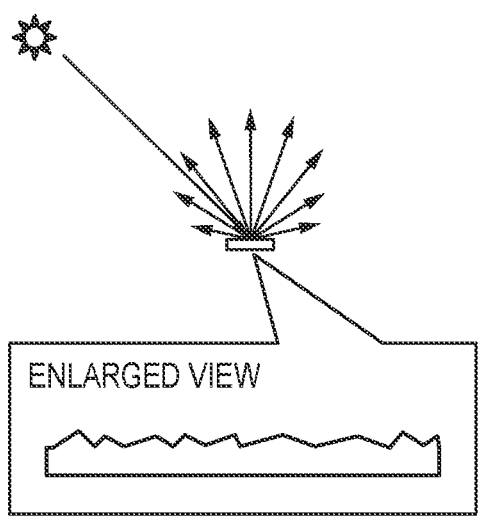
FIG. 21A is a view for explaining a basic structure for surficial diffuse) (0°) control.
Figure 21B:
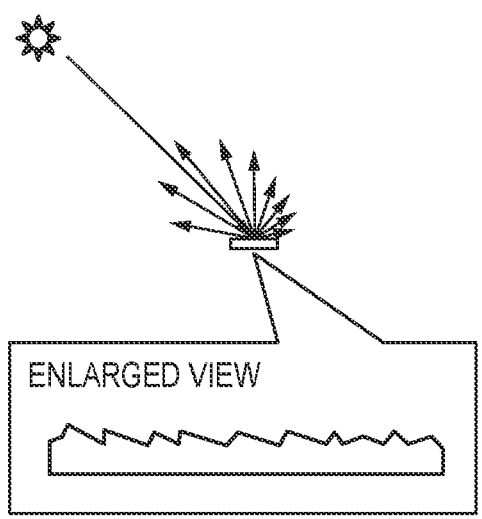
FIG. 21B is a view for explaining a basic structure for surficial diffuse) (30°) control.
Figure 21C:
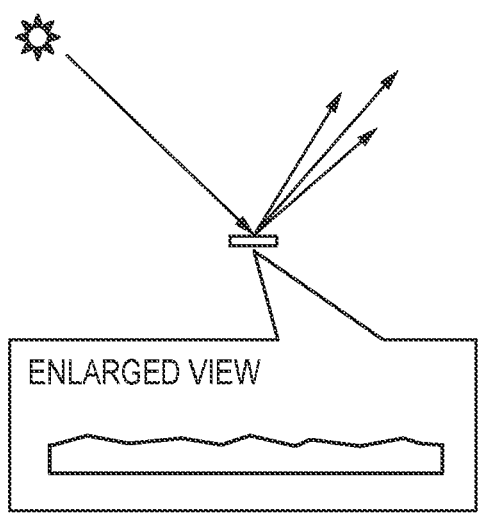
FIG. 21C is a view for explaining a basic structure for specular control.

FIGS. 21A to 21C are views for explaining basic structures for controlling an anisotropic surficial diffuse characteristic. That is, a plurality of basic structures for surficial diffuse control are prepared in correspondence with angles. Basic structures that correspond to the surficial diffuse characteristics for respective angles and can be formed by a forming unit 209 are prepared, and controlled based on an area ratio. Note that the area ratio can be calculated based on the ratio among the input surficial diffuse characteristics at the two angles and the one specular characteristic.

As described above, according to the third embodiment, the area ratio of a plurality of kinds of basic structures formed by the forming unit is controlled based on the ratio among the specular characteristic and surficial diffuse characteristics of an object. Particularly, a plurality of basic structures for surficial diffuse control are used in correspondence with surficial diffuse angles. This makes it possible to create a printed material capable of reproducing the reflection characteristics of an object more correctly even if the surficial diffuse characteristic of the object has angle dependency.

Modifications

In the above-described embodiments, the three kinds of reflection characteristics (internal diffuse characteristic, surficial diffuse characteristic, and specular characteristic) to be input are represented by CIE tristimulus values X, Y, and Z but may be represented based on another criterion. For example, numerical values representing another color, such as CIELAB values with reference to a spectral reflectance or a light source or RGB data associated with a device. One-dimensional data representing a luminance may be used.

The above-described embodiments assume that a specular characteristic to be input is only reflection intensity. However, a parameter representing image clarity may be included. For example, an angle range that is a half value of the intensity of specular reflection or the like is included as a parameter. In this case, as for the basic structure for specular characteristic control described with reference to FIG. 18B, a plurality of basic structures are prepared by changing the amplitude of a normal, and are switched based on an input image clarity parameter.

The above-described embodiments assume that the forming unit 209 includes one kind of clear ink. However, a plurality of clear inks with different refractive indices may be provided. In this case, clear ink to be used is switched in accordance with the intensity of an input specular characteristic or surficial diffuse characteristic.

Figure 22:
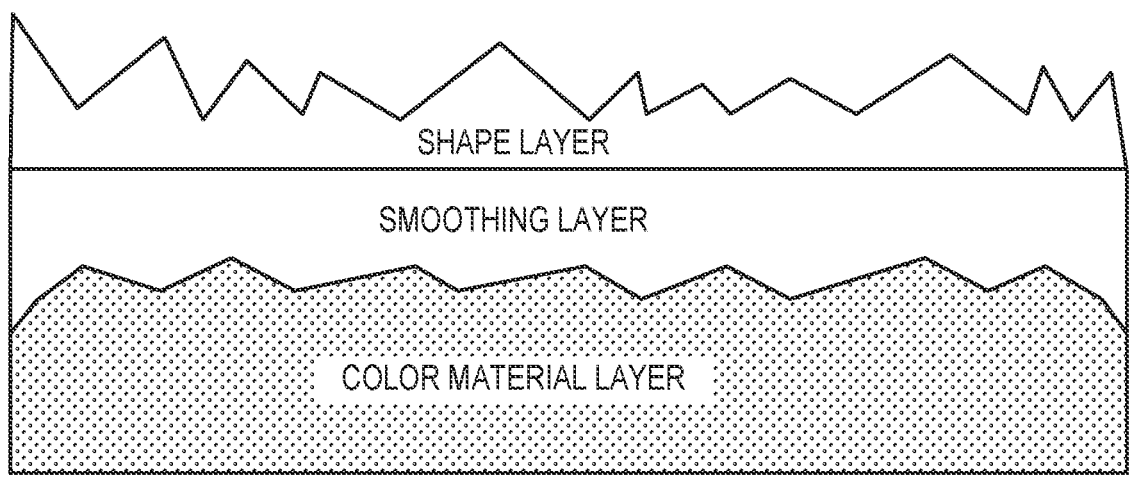
FIG. 22 is a view showing an example of a smoothing layer.

The above-described embodiments have explained a form in which the shape layer is formed on the color material layer. However, as shown in FIG. 22, a smoothing layer for smoothing a surface may be formed between a color material layer and a shape layer. By forming a smoothing layer, it is possible to form a desired shape in a shape layer even if, for example, a color material layer is formed using UV ink or the like to generate an uneven structure on a printing surface.

The above-described first embodiment assumes that an evaluation value for optimization is calculated as a sum of Euclidean distances in the XYZ space, as given by equation (3). However, an evaluation value is not limited to equation (3). For example, conversion into CIELAB values is performed with reference to a predetermined light source, and a color difference formula like $\Delta E$, $\Delta E94$, or $\Delta E2000$ is used, thereby allowing evaluation suitable for human vision. Alternatively, an evaluation formula that weights a difference in specular characteristic and a difference in surficial diffuse characteristic may be adopted.

In the above-described first embodiment, planes formed by dots of clear ink are defined in the same direction, as shown in FIG. 13B. However, the definition of planes is not limited to this. Moreover, an evaluation value may be calculated by including the definition of planes to perform optimization.

In the above description, the specular characteristic, internal diffuse characteristic, and surficial diffuse characteristic of a target object are designated by individual file names in the user input portion 301 shown in FIG. 6. However, a designation method is not limited to this. For example, files having the same file name and different extensions for the respective characteristics may be saved and the one file name may be designated. The characteristic files may be saved in one folder and the name of the folder may be designated. The three characteristics may be described in one file and the file may be designated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
one or more processors; and
one or more memories storing instructions which, when executed by the one or more processors, cause the information processing apparatus to function as a plurality of units comprising:
(1) a first input unit configured to input a characteristic of specular reflection light as a reflected light component in a specular reflection direction with respect to a surface of the object;
(2) a second input unit configured to input a characteristic of internal diffuse reflection light as a reflected light component after scattering and absorption in the object;
(3) a third input unit configured to input a characteristic of surficial diffuse reflection light as a reflected light component in which incident light (a) does not enter an inside of the object and (b) is diffused by unevenness on the surface of the object; and
(4) a control unit configured to control a forming unit to form, based on a first signal corresponding to the characteristic of the internal diffuse reflection light, a first recording layer on a recording medium, and to control the forming unit to form, based on a second signal corresponding to (a) the characteristic of specular reflection light and (b) the characteristic of surficial diffuse reflection light, a second recording layer on the first recording layer.

2. The information processing apparatus according to claim 1, wherein the instructions, when executed by the one or more processors, cause the information processing apparatus to further function as the forming unit.

3. The information processing apparatus according to claim 2, wherein the forming unit forms, after forming the first recording layer, a smoothing layer whose surface is smooth, and forms, after forming the smoothing layer, the second recording layer.

4. The information processing apparatus according to claim 1, wherein the first recording layer is a color material layer formed by color material ink, and the second recording layer is a shape layer formed by clear ink.

5. The information processing apparatus according to claim 1, wherein the instructions, when executed by the one or more processors, cause the information processing apparatus to further function as a first deriving unit that derives the first signal using a color output characteristic of the forming unit for forming the first recording layer.

6. The information processing apparatus according to claim 1, wherein the instructions, when executed by the one or more processors, cause the information processing apparatus to further function as a second deriving unit that derives the second signal using a shape output characteristic indicating a relationship between a signal value and a height of a structure formed by the signal value.

7. The information processing apparatus according to claim 6, wherein the second deriving unit derives the second signal so that a reflection characteristic by a normal distribution on a surface of the second recording layer becomes close to the characteristic of the specular reflection light and the characteristic of the surficial diffuse reflection light.

8. The information processing apparatus according to claim 6, wherein the second deriving unit derives the second signal by determining an area ratio between a first basic structure having a random normal distribution and a second basic structure having a smooth structure so as to match a ratio between the surficial diffuse reflection light and the specular reflection light.

9. The information processing apparatus according to claim 1, wherein the characteristic of internal diffuse reflection light, the characteristic of specular reflection light, and the characteristic of surficial diffuse reflection light are measured using polarizing filters.

10. The information processing apparatus according to claim 1, wherein, when the characteristic of internal diffuse reflection light, the characteristic of specular reflection light, and the characteristic of surficial diffuse reflection light are measured using a light source and a light receiving unit, a first polarizing filter is installed between the light source and the object, and a second polarizing filter is installed between the object and the light receiving unit.

11. The information processing apparatus according to claim 10, wherein the characteristic of specular reflection light is a value obtained by subtracting a measurement value corresponding to a direction different from the specular reflection direction when a direction of the first polarizing filter and a direction of the second polarizing filter are parallel from a measurement value corresponding to the specular reflection direction when a direction of the first polarizing filter and a direction of the second polarizing filter are parallel.

12. The information processing apparatus according to claim 10, wherein the characteristic of surficial diffuse reflection light is a value obtained by subtracting a measurement value corresponding to a direction different from the specular reflection direction when a direction of the first polarizing filter and a direction of the second polarizing filter are orthogonal from a measurement value corresponding to a direction different from the specular reflection direction when a direction of the first polarizing filter and a direction of the second polarizing filter are parallel.

13. The information processing apparatus according to claim 10, wherein the characteristic of internal diffuse reflection light is a measurement value when a direction of the first polarizing filter and a direction of the second polarizing filter are orthogonal.

14. The information processing apparatus according to claim 1, wherein the control unit controls, by discharging clear ink, a normal distribution in the second recording layer.

15. An information processing method comprising:
inputting a characteristic of specular reflection light as a reflected light component in a specular reflection direction with respect to a surface of the object;
inputting a characteristic of internal diffuse reflection light as a reflected light component after scattering and absorption in the object;
inputting a characteristic of surficial diffuse reflection light as a reflected light component in which incident light (a) does not enter an inside of the object and (b) is diffused by unevenness on the surface of the object; and
controlling a forming unit to form, based on a first signal corresponding to the characteristic of the internal diffuse reflection light, a first recording layer on a recording medium, and to control the forming unit to form, based on a second signal corresponding to (a) the characteristic of specular reflection light and (b) the characteristic of surficial diffuse reflection light, a second recording layer on the first recording layer.

16. A non-transitory computer-readable storage medium storing instructions that, when executed by a computer, cause the computer to perform an information processing method, the information processing method comprising:
inputting a characteristic of specular reflection light as a reflected light component in a specular reflection direction with respect to a surface of the object;
inputting a characteristic of internal diffuse reflection light as a reflected light component after scattering and absorption in the object;
inputting a characteristic of surficial diffuse reflection light as a reflected light component in which incident light (a) does not enter an inside of the object and (b) is diffused by unevenness on the surface of the object; and
controlling a forming unit to form, based on a first signal corresponding to the characteristic of the internal diffuse reflection light, a first recording layer on a recording medium, and to control the forming unit to form, based on a second signal corresponding to (a) the characteristic of specular reflection light and (b) the characteristic of surficial diffuse reflection light, a second recording layer on the first recording layer.

* * * * *